(12) United States Patent
Oka et al.

(10) Patent No.: US 7,034,282 B2
(45) Date of Patent: Apr. 25, 2006

(54) OPTICAL ROTARY ENCODER

(75) Inventors: Toru Oka, Tokyo (JP); Yoichi Ohmura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 90 days.

(21) Appl. No.: 10/819,952

(22) Filed: Apr. 8, 2004

(65) Prior Publication Data

US 2004/0206894 A1  Oct. 21, 2004

(30) Foreign Application Priority Data

Apr. 21, 2003 (JP) .............................. 2003-115628
Mar. 4, 2004 (JP) .............................. 2004-060897

(51) Int. Cl.
*G01D 5/34* (2006.01)

(52) U.S. Cl. ................. 250/231.13; 33/1 PT; 356/617; 250/216

(58) Field of Classification Search ..................... None
See application file for complete search history.

(56) References Cited

U.S. PATENT DOCUMENTS

| | | | | |
|---|---|---|---|---|
| 3,983,391 A | * | 9/1976 | Clemons | 250/237 G |
| 4,247,769 A | * | 1/1981 | Warner | 250/231.14 |
| 5,327,218 A | * | 7/1994 | Igaki | 356/499 |
| 5,479,010 A | * | 12/1995 | Shimomura et al. | 250/231.13 |
| 5,837,999 A | * | 11/1998 | Horiuchi | 250/231.14 |
| 5,981,941 A | | 11/1999 | Takata et al. | |
| 6,278,107 B1 | * | 8/2001 | Gaumet | 250/231.13 |
| 6,713,756 B1 | * | 3/2004 | Yamamoto et al. | 250/231.13 |
| 6,891,150 B1 | * | 5/2005 | Takayama et al. | 250/231.13 |
| 2002/0038848 A1 | | 4/2002 | Chin et al. | |

FOREIGN PATENT DOCUMENTS

| | | | |
|---|---|---|---|
| JP | 58-147654 | | 9/1983 |
| JP | 64-74412 | | 3/1989 |
| JP | 01074412 A | * | 3/1989 |
| JP | 9-196703 | | 7/1997 |
| JP | 10-221121 | | 8/1998 |

* cited by examiner

*Primary Examiner*—Stephone B. Allen
*Assistant Examiner*—Davienne Monbleau
(74) *Attorney, Agent, or Firm*—Leydig, Voit & Mayer, Ltd.

(57) ABSTRACT

An optical rotary encoder for acquiring rotation information regarding a shaft includes a light source located on or in the vicinity of the axis of rotation of the shaft for emitting light rays and a code wheel mounted on the shaft for rotation about the axis of rotation. The code wheel has a plurality of alternating light transmissive and non-light transmissive areas in a circumferential direction. A reflector is spaced a distance from the code wheel for reflecting the light rays emitted from the light source so that they are turned into a parallel beam of light. The parallel beam of light illuminates the light transmissive areas of the code wheel so that light passing through the light transmissive areas is directed toward a peripheral region of the light source. The encoder also includes one or more light-detecting element for detecting the light passing through the light transmissive areas.

22 Claims, 16 Drawing Sheets

OPTICAL ROTARY ENCODER

RELATED APPLICATION

This application is based on Japanese Patent Applications Nos. 2003-115628 and 2004-60897, the content of which is incorporated herein by reference.

BACKGROUND OF THE INVENTION

1. Field of the Invention

The present invention relates to an optical rotary encoder for acquiring rotation information such as rotation angle/speed of a rotating shaft.

2. Description of the Related Art

Conventionally, there have been known various types of optical encoder.

Japanese Patent Publication No. 2002-48602 discloses an optical rotary encoder that includes a scale with a reflective-type optical pattern or diffraction grating pattern for rotation about an axis or centerline and a substrate on which a surface-emitting light source is located on the axis of rotation of the scale and a plurality of light-detecting elements are arranged in a circumferentially equally spaced relation and around the light source.

Japanese Patent Publication No. 58-147654 discloses an optical rotary encoder in which a plurality of light-detecting elements are arranged circumferentially and entirely around the axis of rotation and located at a side opposite to the light source with regard to a code wheel.

Japanese Patent Publication No. 9-196703 discloses an optical rotary encoder in which a light source is located on the axis of rotation of the code wheel. Light emitted from the light source enters the code wheel and then is reflected through its two inclined planes at a 45 degrees angle with regard to the axis of rotation and then enters a code pattern (slit openings) in a direction perpendicular to the code pattern.

Japanese Patent Publication No. 64-74412 discloses an optical linear encoder in which a light-emitting element and light-detecting elements are located at a side opposite to a reflecting mirror with regard to a scale. The mirror reflects light rays from the light-emitting element so that parallel beam of light is directed toward the light-detecting elements.

U.S. patent application Publication No. 2002/0038848 discloses an optical rotary encoder in which a reflective surface is formed on the code wheel. Light emitted from the light source is reflected through the reflective surface so that the reflected light is parallel to the axis of rotation of the code wheel.

In the optical rotary encoder described in JP 2002-48602 (A), light beam emitted from the light enters the scale so that the principal axis of the beam is perpendicular to the scale. Light beam that enters a region at a radius of r1 on the scale and is reflected therethrough is incident into a region at a radius of r2 on the light-detecting elements. The radii r1 and r2 satisfy an equation (1) $r2=r1(z1+z2)/z1$ where z1 is a distance between the light source and the scale and z2 is a distance between the scale and the light-detecting elements. Since the thickness of the light source is sufficiently smaller than the distance between the light source and the scale, the equation (1) leads to an approximate equation (2) $r2=2\times r1$.

In gengeral, in order to obtain an optical rotary encoder with high resolution, the number of slit opening of the code pattern on the code wheel need to be increased. Further, in order to reduce the size of the code wheel while the number is maintained, the pitch of the slit openings must be reduced. The limitations on size of the code wheel and therefore of the encoder and on level of resolution are deteermined by the degree to which the pitch of the slit openings can be reduced. In the case of the opitcal rotary encoder in JP 2002-48602 (A), the radial length of the light-emitting elements is twice as that of the code pattern in accordance with the equation (2). In other words, even if the pitch of the slit openings of the code pattern is reduced as possible, the size of the encoder depends upon the size of the light-detecting elements having a radial length twice as large as that of the code pattern, which may result in an insufficient downsizing and level of resolution.

Also, since beam of light which is reflected by the scale and then enters the light-detecting elements is not parallel, if the distance between the light-detecting elements and the scale is varied, an illumination on the scale is greatly changed. As a result, the quanty of light-deteced by the light-detecting elements varies, leading to detection error.

Further, since the scale is of a reflective type, if the scale is inclined, a light pattern projected onto the light-detecting elements changes, resulting in detection error.

In JP 9-196703 (A), although light that enters the code wheel from the light source is parallel beam of light, since the light is reflected through the two inclined planes at a 45 degrees angle with regard to the axis of rotation and then illuminates the code pattern, the variation in orientation of the shaft would cause an illumination distribution on the code pattern to be greatly changed. This also results in detection error. Further, since the width of the beam of light illuminated on the code pattern is about a half as large as the diameter of the parallel beam of light that enters the code wheel, a region where the code pattern can be formed is limited. As a result, downsizing of the encoder would lead to a lower quantity of detected light, thereby limiting its level of resolution.

SUMMARY OF THE INVENTION

An object of the present invention is to provide a small optical rotary encoder with high resolution in which detection error is suppressed even if the code wheel is inclined due to, for example, variation in orientation of the shaft.

To achieve the above object, an aspect of the present invention is an optical rotary encoder for acquiring rotation information of a shaft, which includes a light source located on or in the vicinity of the axis of rotation of the shaft for emitting light rays and a code wheel mounted on the shaft for rotation about the axis of rotation. The code wheel has a plurality of alternating light transmissive and non-transmissive areas in a circumferential direction. A reflector is spaced a distance from the code wheel for reflecting the light rays emitted from the light source so that they are turned into parallel beam of light. The parallel beam of light illuminates the light transmissive areas of the code wheel so that light passing through the light transmissive areas is directed toward a peripheral region of the light source. The encoder also includes one or more light-receiving elements for receiving the light passing through the light transmissive areas.

According to the aspect of the invention, since the reflector for reflecting the light rays emitted from the light source so that they are turned into parallel beam of light is located at a side opposite to the light source and the light-receiving elements with regard to the code wheel, the parallel light of beam can entirely illuminate a circumferential code pattern composed of the alternating light transmissive and non-transmissive areas. This enables a high level of resolution to be maintained if the size of the encoder (the radial length of the light-receiving elements) is reduced. In a preferable embodiment, the parallel beam of light is generally parallel to the shaft, allowing the encoder to be much smaller. Also, even if the orientation of the shaft is varied, since the code pattern is of a transmissive type, the relative position of the light source and the reflector is unchanged because the code wheel to which the shaft is connected and the reflector are separate, and the code pattern is illuminated by the parallel beam of light, the variation in the illumination distribution on the light-receiving elements due to the variation in orientation of the shaft can be suppressed, allowing an optical rotary encoder with small detection error to be provided.

BRIEF DESCRIPTION OF THE DRAWINGS

The above-mentioned and other objects, advantages and features of the invention will become apparent from the following description thereof taken in conjunction with the accompanying drawings in which.

DETAILED DESCRIPTION OF THE PREFERRED EMBODIMENTS

With reference to the drawings, preferred embodiments of the present invention will be described hereinafter. In the description, although the terminology indicating directions (e.g. "upper", "lower", "right", "left" or others containing these terms) are conveniently used just for clarity, it should not be interpreted that those terminology limit the scope of the present invention.

First Embodiment

Figure 1A:
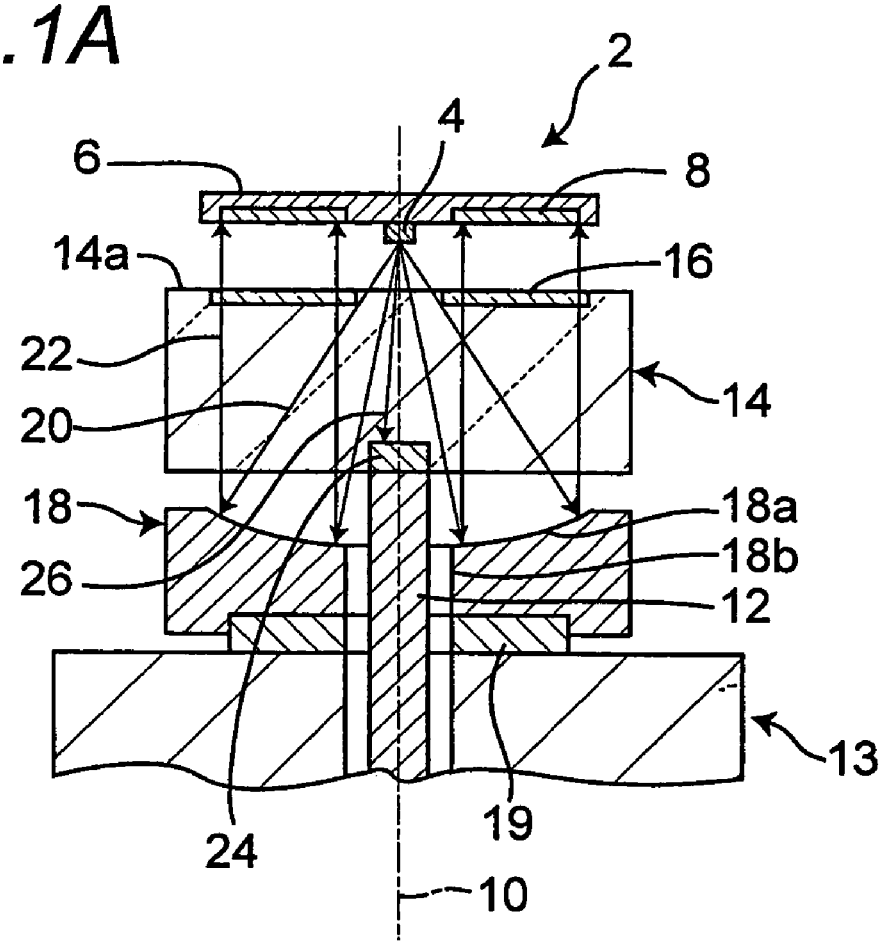
FIG. 1A is a schematic cross-sectional view taken along the axis of rotation of the shaft in a first embodiment of the optical rotary encoder according to the present invention.
Figure 1B:
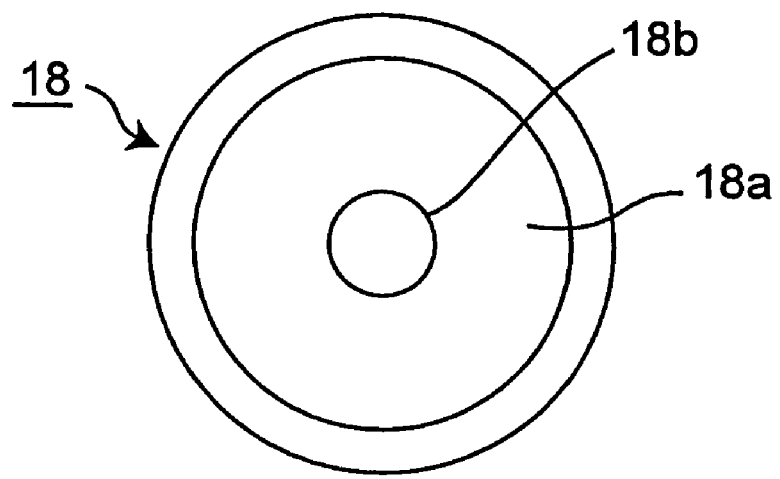
FIG. 1B is a top view of the concave mirror in FIG. 1A.

Referring to FIG. 1A, there is shown an optical rotary encoder, which is a first embodiment according to the present invention. The encoder, generally indicated at reference number 2, includes a surface-emitting light source 4 centrally located on a substrate 6. The light source 4 may be a light-emitting diode (LED) or a surface-emitting semiconductor laser. The encoder 2 also includes a plurality of light-receiving elements 8 such as photodiode which surround the light source 4 and are monolithically fabricated on the substrate 6. The light source 4 is located on an axis of rotation or centerline 10 of a shaft 12 of a device such as motor 13. The light-receiving elements 8 are arranged in a circumferentially equally spaced relation and entirely around the light source 4, which will be described in more detail below in the third embodiment.

Mounted on the shaft 12 is a cylindrical code wheel 14 which is spaced from the substrate 6 and made of light transmissive material such as PMMA (polymethyl methacrylate) resin. The code wheel 14 is fixed on the shaft 12 using, for example, an adhesive. The code wheel 14 has a code pattern 16 on a surface 14a opposed to the substrate 6. The code pattern 16 has a plurality of alternating light transmissive areas (slit openings) and non-transmissive areas arranged in a circumferential direction, which will be described in more detail in the fourth embodiment. The code pattern 16 may be formed by means of, for example, evaporation of chromium layer. Preferably, the code pattern 16 has a radial length larger than that of the light-receiving elements 8.

With reference also to FIG. 1A, the encoder 2 further includes a reflector or concave mirror 18 which has a spherical reflective surface 18a opposed to a lower surface of the code wheel 14 opposite to the upper surface 14a thereof. The concave mirror 18 has a through hole 18b through which the shaft 12 is extended. The concave mirror 18 is fixed on a housing portion 19 of the motor 13. The light source 4 is positioned in the focal point of the spherical reflective surface 18a.

In an operation of the encoder 2 so constructed, part of light rays 20 emitted from the light source 4 passes via a portion of the surface 14a surrounded by the code pattern 16 into the code wheel 14 and enters the reflective surface 18a. Most of them are reflected through the reflective surface 18a as parallel beam of light 22. The parallel beam of light 22 is a bundle of light rays which neither diverge nor converge, each of the light rays being substantially parallel to each other. In the embodiment, the parallel beam of light 22 is parallel to the centerline 10.

The parallel beam of light 22 passes through the code wheel 14 and illuminates the code pattern 16 thereon, so that light passing through the code pattern 16 enters the light-receiving elements 8 located in a peripheral region of the light source 4. The incident light has an intensity distribution of square wave (where it is not diffracted at the code pattern 16) or sine wave (where it is diffracted at the code pattern 16) which corresponds to the code pattern 16. The light-receiving elements 8 convert the incident light into an electrical signal indicative of a rotation angle/speed of the code wheel 14 and therefore the shaft 12.

As shown, a light absorption layer 24 is mounted on the upper end of the shaft 12. Accordingly, part of light rays 26 emitted from the light source 4 which is not directed toward the concave mirror 18 but toward the end of the shaft 12 enters the light absorption layer 24. As such, the light rays 26 do not cause detection error. In other words, the light absorption layer 24 functions to eliminate light which may cause detection error, i.e. light which is reflected back into the light source 4 and stray light which is reflected by a member other than the concave mirror 18 and enters the light-receiving elements 8. The light absorption layer 24 may be mounted on the centerline 10 instead of on the end of the shaft 12.

Note that if the light source positioned on the centerline 10 and in the focal point of the reflective surface 18a is assumed to be a point light source, the beam of light reflected through the reflective surface 18a can be completely parallel. However, since the light source 4 is not a point and has a size, the beam of light reflected through the reflective surface 18a is not completely parallel. Herein, the term "parallel beam of light" designates beam of light that is parallel or substantially parallel.

The radius of curvature r and the focus distance f of the spherical reflective surface 18a of the concave mirror 18 satisfy an equation $r=2\times f$. These r and f are optical lengths, because the code wheel 14 is made of transparent dielectric having a refractive index such as PMMA resin and light incident into boundary surfaces of the code wheel 14 when entering or being emitted from the code wheel 14 is refracted unless the incident angle is 0 degree. Herein, the refraction of light rays is not depicted for simplicity of the drawings.

According to the embodiment, since the parallel beam of light 22 is achieved by positioning the concave mirror 18 below the code wheel 14, i.e. at a side opposite to the substrate 6 with regard to the code wheel 14, it can entirely illuminate the circumferential code pattern 16, allowing a small optical rotary encoder with high resolution to be provided. Also, even if the orientation of the shaft 12 is varied, since the code pattern 16 is of a transmissive type, the relative position of the light source 4 and the concave mirror 18 is unchanged (because the code wheel 14 to which the shaft 12 is connected and the concave mirror 18 are separate.), and the code pattern 16 is illuminated by the parallel beam of light 22, the variation in illumination distribution on the light-receiving elements 8 due to the variation in orientation of the shaft can be suppressed, allowing an optical rotary encoder with small detection error to be provided. Further, since no complicated optical system is used and the optical axes of the light source 4 and the concave mirror 18 can be coincident with the centerline 10, manufacturing and size constraints can be reduced, allowing downsizing of the encoder. In addition, light emitted from the light source 4 is turned into parallel light of beam 22 by one reflection at the concave mirror 18 located at a side opposite to the light source with regard to the code pattern 16. Accordingly, compared with a construction described in JP 9-196703 (A) where parallel beam of light for illuminating the code pattern is obtained by two reflections at a reflection angle of 45 degrees, the width (of the light transmissive areas) of the code pattern 16 relative to the diameter of the code wheel 14 can be set larger, allowing a higher level of resolution to be readily provided.

Furthermore, since the light-receiving elements 8 are disposed over the entire circumference, detection error due to, for example, deflection, eccentricity or inclination of the shaft 12 or width accuracy of the transmissive areas of the code pattern 16 can be reduced. As a result, if the size of the encoder is reduced, a sufficient light-receiving surface area can still be obtained, ensuring high accuracy detection and high resolution. Although the light-receiving elements 8 are preferably disposed over the entire circumference, they may be disposed in at least one region which light emitted from the code pattern 16 enters. In this case, the reflective surface 18a may have a sufficient surface area on the concave mirror 18 to reflect light rays to illuminate the light-receiving elements 8 and, accordingly, may not be formed entirely around the centerline 10. An absorption layer may be formed on a surface portion where the reflective surface 18a is not formed.

The concave mirror 18 may be a Fresnel lens which has a lens surface having a radius curvature equal to that of the spherical reflective surface 18a and on which a layer of, for example, aluminum or gold is formed by means of evaporation. Alternatively, the mirror 18 may be a reflective diffractive optical element. Each allows the thickness of the mirror 18 to be smaller.

Although in the embodiment the light-receiving elements 8 are monolithically fabricated on the substrate 6, they may be of a hybrid type, i.e. they may be mounted on the substrate 6. The concave mirror 18 may have an aspherical reflective surface such as paraboloid for the reduction of aberration. Although the light source 4 is preferably mounted on the substrate 6, it may be on a separate substrate. The light source 4 may be in the vicinity of the centerline 10, which is included in the scope of the invention.

Figure 2A:
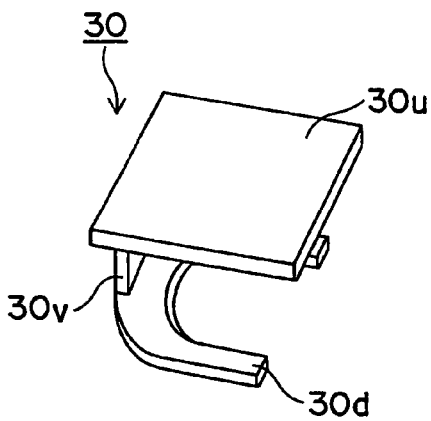
FIG. 2A is a perspective view of a holder used for assembling the encoder in FIG. 1A.
Figure 2B:
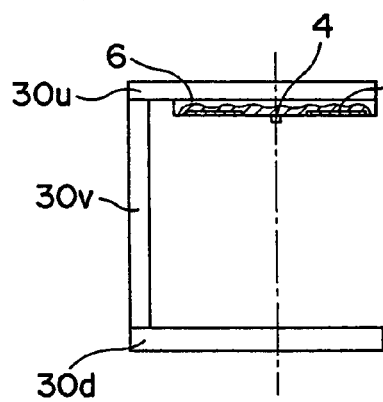
FIGS. 2B–2D are an exemplary assembling process of the encoder in FIG. 1A.

Referring to FIGS. 2A–2E, an exemplary assembling process of the encoder 2 will be described hereinafter. First, a holder 30 is prepared which includes flat upper and lower supports 30u and 30d connected with a vertical member 30v so that the supports 30u and 30d are spaced in parallel to each other (FIG. 2A). Then, the substrate 6 having the light source 4 and the light-receiving elements 8 thereon is fixed on the lower surface of the upper support 30u (FIG. 2B). The lower support 30d has a transverse cross section in the form of a U so that the housing portion 19 of the motor 13 is fitted into the lower support 30d. To this end, the housing portion 19 is a cylindrical projection and the lower support 30d has an inner wall having a diameter generally equal to the outer diameter of the housing portion 19. Also, with the substrate 6 positioned on the upper support 30u, the center of the inner wall is located on the optical axis of the light source 4. The thickness of the lower support 30d is thinner than a gap between the lower surface of the concave mirror 18 and an opposed surface of the motor housing.

Figure 2C:
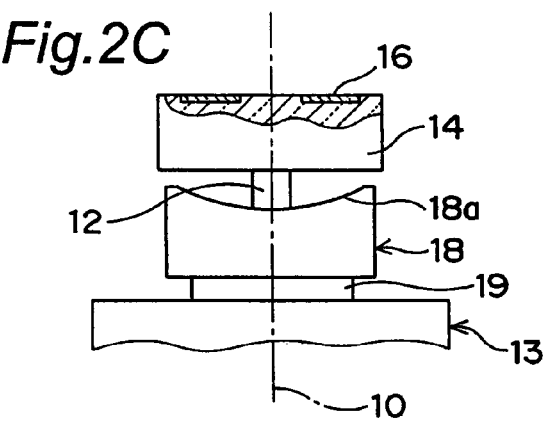

On the other hand, the concave mirror 18 is fixed on the housing portion 19 of the motor 13 so that the optical axis of the concave mirror 18 is coincident with the axis of rotation 10 of the shaft 12 (FIG. 2C). To this end, the mirror 18 has a cylindrical hole at the bottom into which the cylindrical motor housing portion 19 is fitted (see FIG. 1A). Then, the code wheel 14 is fixed on the end of the shaft 12 so that a center of the code pattern 16 is located on the axis of rotation 10. To this end, the code wheel 14 has a cylindrical hole at the bottom into which the end of the shaft 12 is fitted. The relative position of the code wheel 14 and the shaft 12 is adjusted by rotating the shaft to confirm whether the code wheel 14 does not eccentrically rotate, using an image processing for example.

Figure 2D:
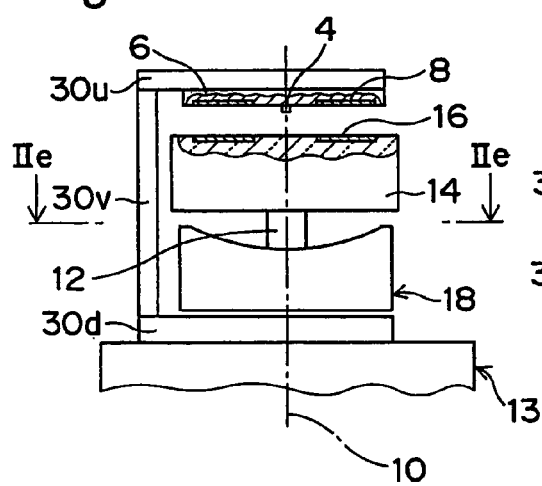
Figure 2E:
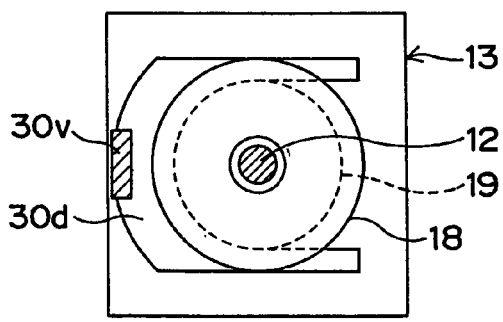
FIG. 2E is a cross-sectional view taken along line IIe—IIe of FIG. 2D.

Then, referring to FIGS. 2D and 2E, the holder 30 with the substrate 6 is transversely moved relative to the code wheel 14, the concave mirror 18 and the shaft 12 (motor 13) so that the holder 30 is positioned with the lower support 30d against the housing portion 19. In this state, the optical axes of the light source 4 and the concave mirror 18 are coincident with each other.

As such, since the concave mirror 18 and the holder 30 are aligned by a single element, i.e. the housing portion 19, the optical axes of the light source 4 and the concave mirror 18 can be set to coincide with each other with high accuracy.

Although in the embodiment the peripheries of the concave mirror 18, the through hole 18b and the housing portion 19 are circular, they may have other shapes.

Second Embodiment

Figure 3A:
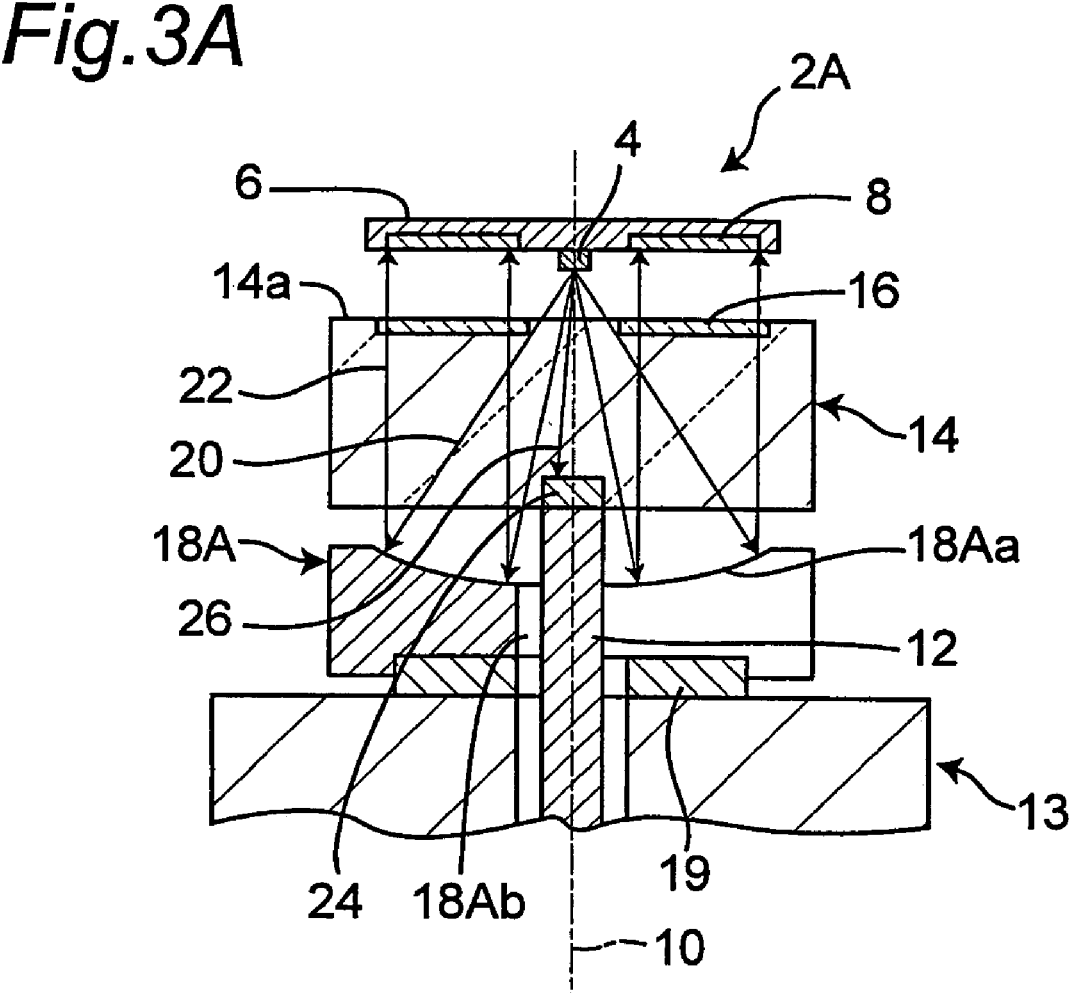
FIG. 3A is a schematic cross-sectional view taken along the axis of rotation of the shaft in a second embodiment of the optical rotary encoder according to the present invention.
Figure 3B:
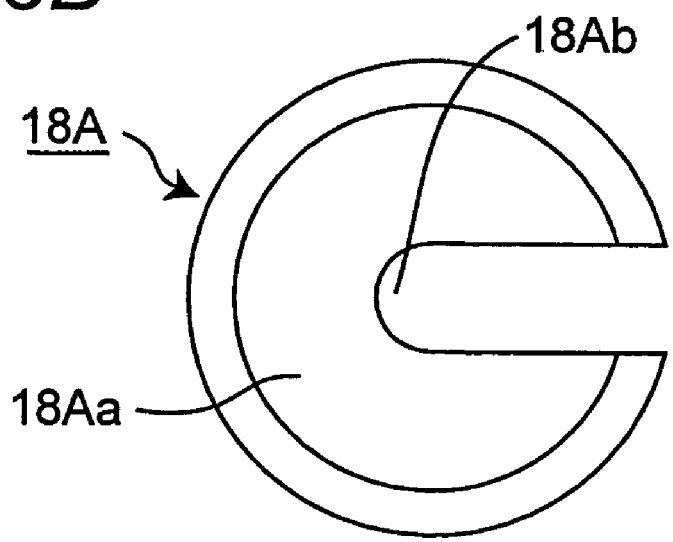
FIG. 3B is a top view of the concave mirror in FIG. 3A.

FIG. 3A shows a second embodiment of the optical rotary encoder of the present invention. In a description below, elements identical or similar to those in the first embodiment are indicated by identical reference numbers or those with suffixes. The encoder 2A of the present embodiment is similar to the encoder 2 of the first embodiment except that the concave mirror 18A has a transverse cross section in the form of a U or horseshoe, as best shown in FIG. 3B. In other words, the concave mirror 18A has an opening which extends along the centerline 10 and connects the through hole 18b for the shaft 12 and the peripheral surface of the mirror. This enables an assembly task of the encoder to be performed with higher accuracy as described below.

Note that in the embodiment the reflective surface 18Aa of the concave mirror 18A and therefore the light-receiving elements 8 are not disposed over the entire circumference about the centerline 10.

Figure 4A:
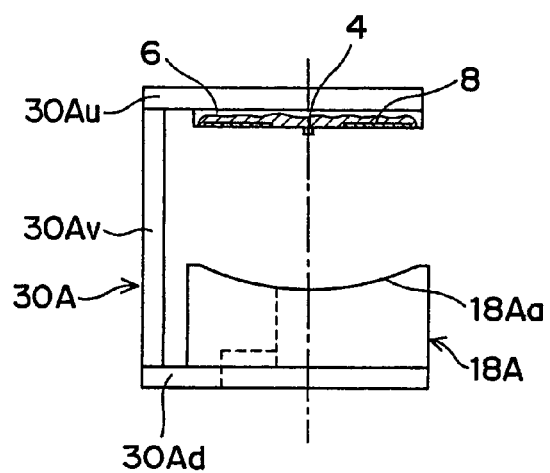
FIGS. 4A–4C are an exemplary assembling process of the encoder in FIG. 3A.

Referring to FIGS. 4A–4D, an exemplary assembling process of the encoder 2A will be described hereinafter. First, a holder 30A is prepared which includes flat upper and lower supports 30Au and 30Ad connected with a vertical member 30Av so that the supports 30Au and 30Ad are spaced in parallel to each other (FIG. 4A). Then, as shown in FIG. 4A, the substrate 6 having the light source 4 and the light-receiving elements 8 thereon and the concave mirror 18A are fixed on the lower surface of the upper support 30Au and the upper surface of the lower support 30Ad, respectively, so that the optical axes of the light source 4 and the concave mirror 18A are coincident with each other. The relative position of the substrate 6 and the concave mirror 18A is adjusted by emitting light rays from the light source 4 and receiving light reflected by the concave mirror 18A by the light-receiving elements 8 and then analyzing an electrical signal from the elements. The lower support 30Ad has a transverse cross section in the form of a U. The housing portion 19 of the motor 13 is a cylindrical projection and the lower support 30Ad has an inner wall having a diameter generally equal to the outer diameter of the housing portion 19.

Figure 4B:
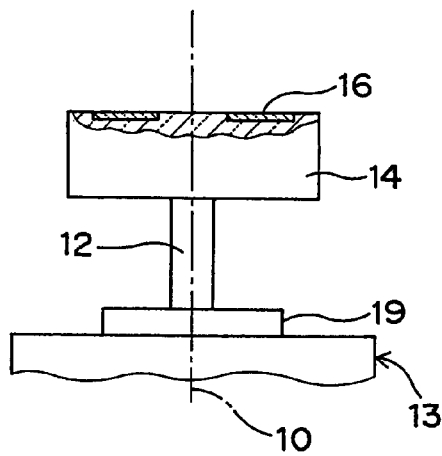

On the other hand, the code wheel 14 is fixed on the end of the shaft 12 so that a center of the code pattern 16 is located on the axis of rotation 10, like in the first embodiment (FIG. 4B).

Figure 4C:
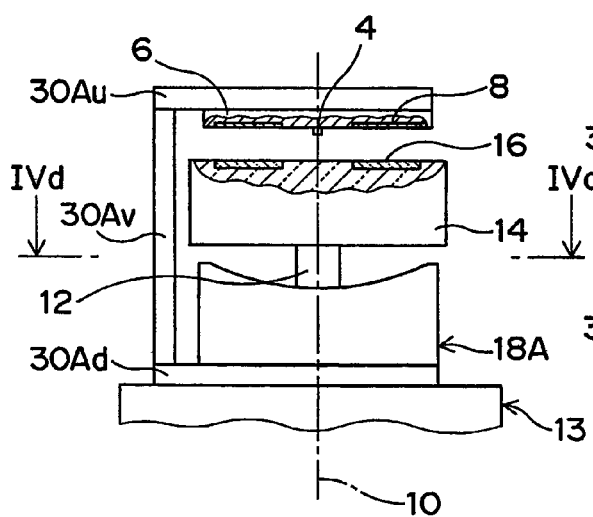
Figure 4D:
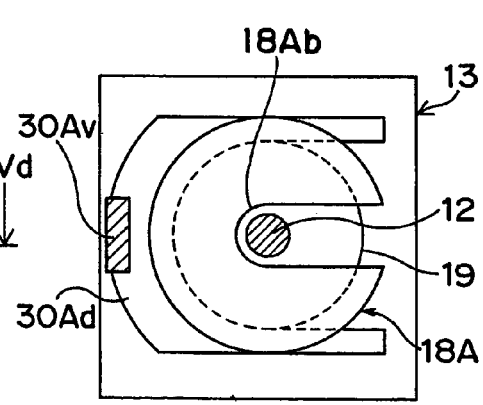
FIG. 4D is a cross-sectional view taken along line IVd—IVd of FIG. 4C.

Then, referring to FIGS. 4C and 4D, the holder 30A with the substrate 6 and the concave mirror 18A is transversely moved relative to the code wheel 14 and the shaft 12 (motor 13) so that the shaft 12 is inserted into the through hole 18Ab via the opening. Accordingly, the holder 30A is positioned with the lower support 30Ad against the housing portion 19. In this state, the optical axis of the light source 4 is coincident with the axis of rotation 10 of the shaft 12.

In the first embodiment, the relative position between the substrate 6 having the light source 4 and the light-receiving elements 8 thereon and the concave mirror 18 is difficult to be adjusted because the code wheel 14 has already been located therebetween.

In contrast, in the embodiment, the relative positions between the substrate 6 and the concave mirror 18A and between the code wheel 14 and the shaft 12 can be separately and therefore easily adjusted, which allows an assembly task of the encoder to be performed with higher accuracy.

Figure 5A:
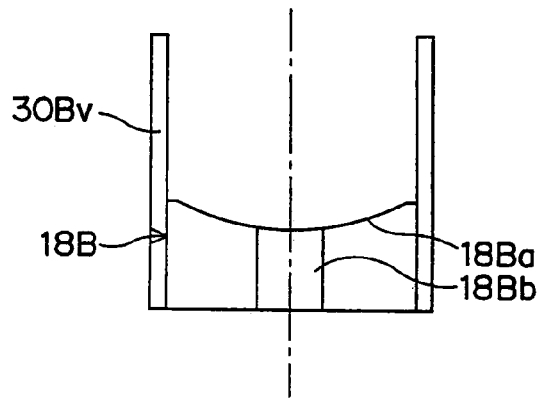
FIGS. 5A–5C are another exemplary assembling process of the encoder in FIG. 3A.
Figure 5B:
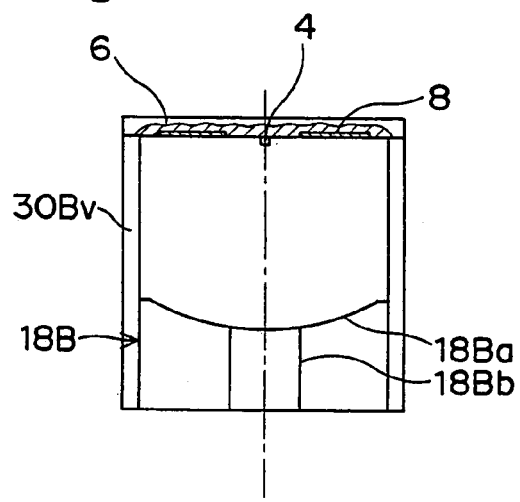
Figure 5C:
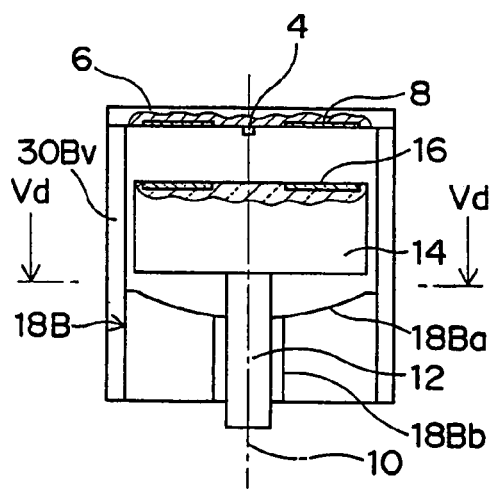
Figure 5D:
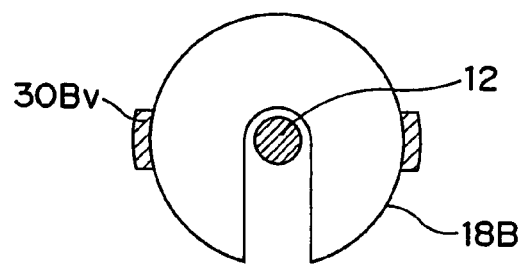
FIG. 5D is a cross-sectional view taken along line Vd—Vd of FIG. 5C.

Referring to FIGS. 5A–5D, the holder may be molded integral with the concave mirror. In this variant, the holder has a pair of vertical members 30Bv extending upwardly from the concave mirror 18B (which consists of a concave member on an upper surface of which a reflective surface or layer 18Ba is formed by means of evaporation), as shown in FIG. 5A. In an assembling, the substrate 6 with the light source 4 and the light-receiving elements 8 thereon is positioned on upper ends of the vertical members 30Bv so that the axes of the light source 4 and the concave mirror 18B are coincident with each other (FIG. 5B). Then, the shaft 12 with the code wheel 14 at its upper end is inserted into the through hole 18Bb of the mirror 18B via the opening (FIGS. 5C and 5D).

In this variant, since the holder is molded integral with the concave mirror 18B, the optical axes of the light source 4 and the concave mirror 18B can be set to coincide with each other with high accuracy. This is also advantageous in that parts counts are reduced.

Note that this variant may be applied to the first embodiment.

Third Embodiment

Figure 6B:
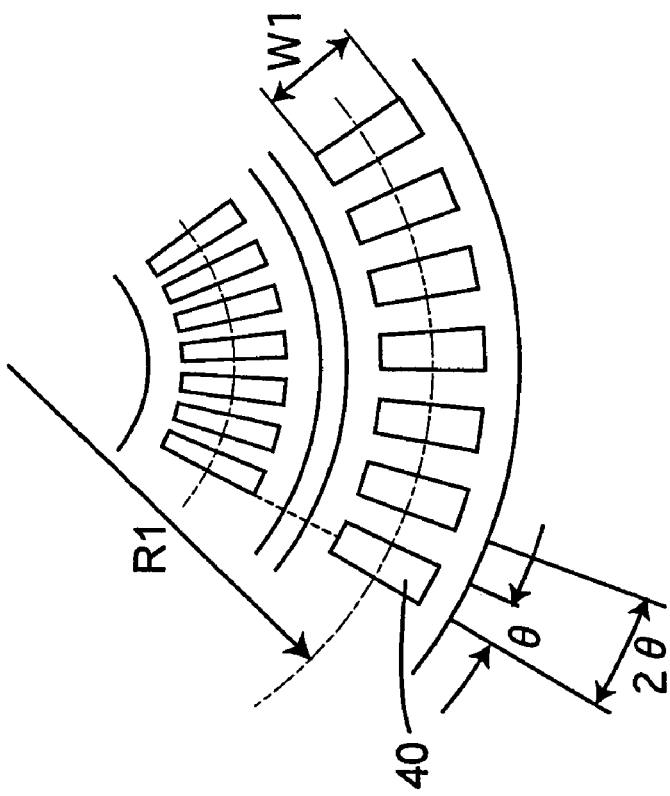
FIG. 6B is an enlarged partial view of the light-detecting elements in FIG. 6A.
Figure 6A:
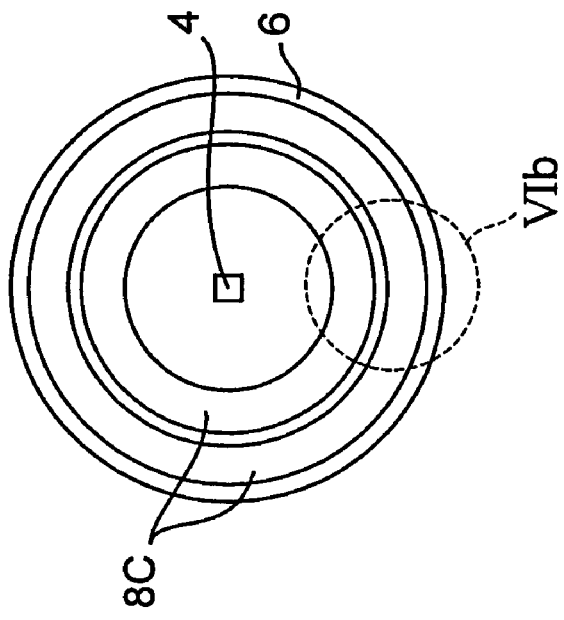
FIG. 6A is a top view showing light-detecting elements in a third embodiment of the optical rotary encoder according to the pattern invention.

Referring to FIGS. 6A and 6B, a third embodiment of the optical rotary encoder according to the present invention will now be described. The light-receiving elements 8C of the encoder each includes a receiving surface 40 for converting light into an electrical signal. The surfaces 40 are arranged in a circumferentially equally spaced relation and entirely around an emitting surface of the light source 4. An angle frequency of the receiving surfaces 40 and an aperture angle of each of the surfaces 40 are set to be 2 θ and θ, respectively. The light-receiving elements 8C consist of an inner circumferential group or track of elements and an outer circumferential group or track of elements. The receiving surfaces 40 of the outer track are located with their radial midpoint at a radial distance of R1 from the emitting surface of the light source 4 and have a radial width of W1. The receiving surfaces 40 of the inner track have a phase shifted, for example, 90 degrees with regard to that of the outer track.

The number of the tracks may not be two and should be selected according to an angle/speed detection method or desired detection resolution/accuracy. Also, the ratio of the aperture angle to the angle frequency and/or the shape/size of the receiving surface 40 should be designed according to an angle/speed detection method or desired detection resolution/accuracy.

In the embodiment, since the light-receiving elements 8C are disposed over the entire circumference, detection error due to, for example, deflection, eccentricity or inclination of the shaft 12 (FIG. 1A) or width accuracy of the transmissive areas of the code pattern 16 can be reduced. As a result, if the size of the encoder is reduced, a sufficient light-receiving surface area can still be obtained, ensuring high accuracy detection and high resolution. Although the light-receiving elements 8C of each track are preferably disposed over the entire circumference, they may be disposed in at least one region which light emitted from the code pattern enters. Preferably, two or more light-receiving elements 8C having an identical phase are disposed in a circumferential equally spaced relation to each other about the light source 4. The light-receiving elements 8C in the same track may have different phases.

Fourth Embodiment

Figure 7A:
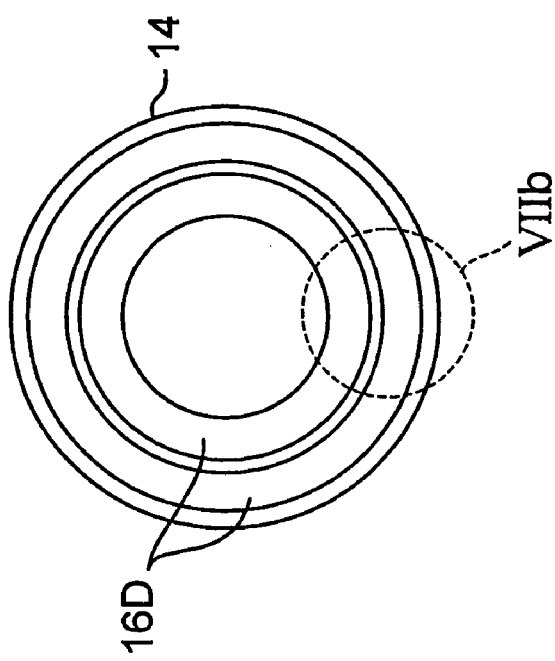
FIG. 7A is a top view showing a code wheel of a fourth embodiment of the optical rotary encoder according to the present invention.
Figure 7B:
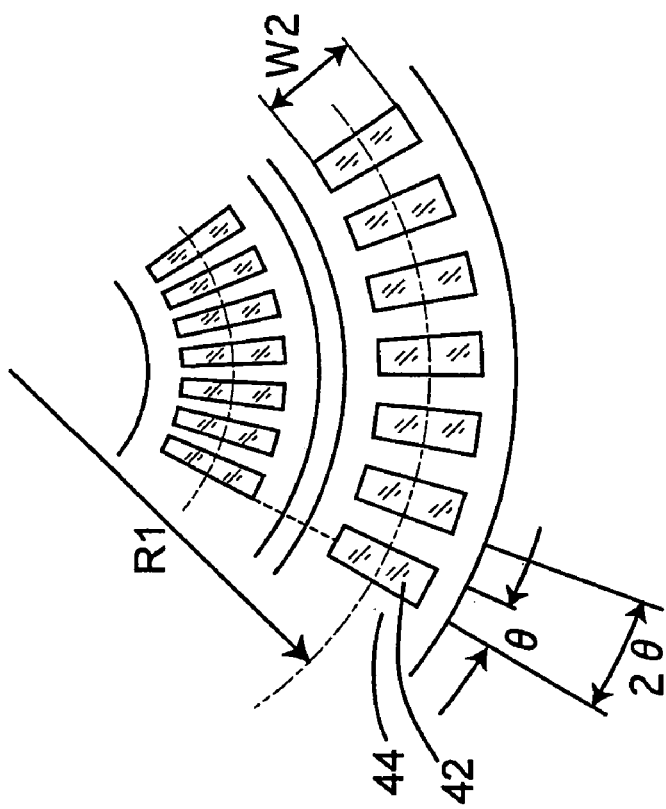
FIG. 7B is an enlarged partial view of the code wheel in FIG. 7A.

Referring to FIGS. 7A and 7B, a fourth embodiment of the optical rotary encoder according to the present invention will now be described. The code pattern 16D of the encoder includes transmissive areas 42 which are delimited by an evaporated layer 44 made of, for example, chromium and are arranged in a circumferentially equally spaced relation and entirely around the centerline of the code wheel 14. The code pattern 16D is used together with the light-receiving elements 8C described in the third embodiment. An angle frequency of the transmissive areas 42 and an aperture angle of each of the areas are set to be 2θ and θ, respectively. The code pattern 16D consists of an inner circumferential group or track of alternating light transmissive and non-transmissive areas and an outer circumferential group or track of alternating light transmissive and non-transmissive areas. The transmissive areas 42 of the outer track are located with their radial midpoint at a radial distance of R1 from the centerline of the code wheel 14 and have a radial width of W2. W2 is set to be larger than W1 (see FIG. 6b). The transmissive areas 42 of the inner track have a phase shifted, for example, 90 degrees with regard to that of the outer track.

The number of the tracks may not be two and should be selected according to an angle/speed detection method or desired detection resolution/accuracy. Also, the ratio of the aperture angle to the angle frequency and/or the shape/size of the transmissive areas 42 should be designed according to an angle/speed detection method or desired detection resolution/accuracy.

By setting the radial width of the transmissive area 42 (W2) larger than that of the receiving surface 40 (W1), even if the code wheel 14 is moved in a radial direction relative to the light-receiving elements 8C, a variation in illumination distribution of light rays which illuminate the receiving surfaces 40 can be suppressed as long as the outer periphery or inner periphery of the transmissive area does not travel across the outer periphery or inner periphery of the receiving surface 40 with regard to the radial direction. Note that the relationship W2>W1 is not restrictive of the present invention.

Although in the embodiment the code pattern 16D is an amplitude grating, it may be a phase grating. For example, in case of a phase grating having a square waveform in cross-section wherein the concave and the convex have an identical width and a difference in optical path length between the concave and the convex is half as large as a wavelength of light passing through the grating, the angle frequency of the code pattern 16D is set to be twice as large as that of the light-receiving elements 8C. This is because, in case of such phase grating pattern 16D having an angle frequency of 4 θ, a Fresnel diffraction figure, which is spaced a distance from the pattern 16D, has an angle frequency of 2 θ.

Fifth Embodiment

Figure 8:
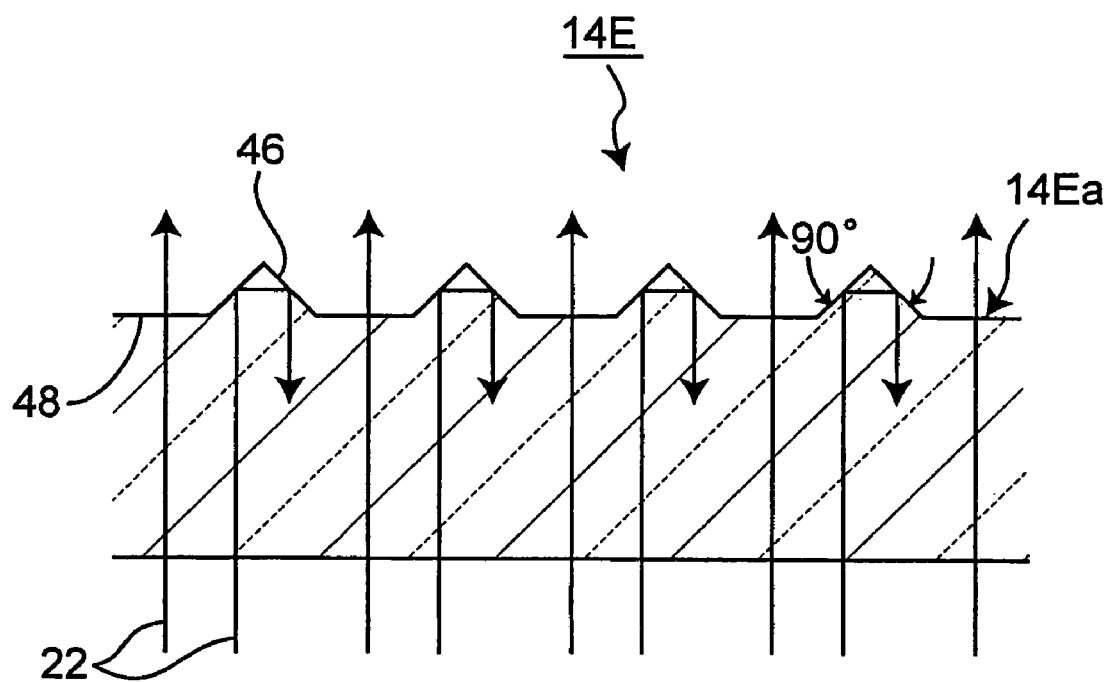
FIG. 8 is a cross-sectional view showing a code wheel of a fifth embodiment of the optical rotary encoder according to the present invention.

Referring to FIG. 8, a fifth embodiment of the optical rotary encoder according to the present invention will now be described. In the embodiment, instead of the evaporated layer of chromium 44 as in the fourth embodiment, the code wheel 14E of the encoder has, as non-transmissive areas, a plurality of V-projections 46 which are disposed periodically along a flat surface 14Ea opposed to the substrate 6 (FIG. 1A). Note that V-grooves may be used instead. The flat regions 48 between the adjacent V-projections 46 constitute transmissive areas of the code pattern. In the example shown, the code wheel 14E is made of PMMA having a refractive index of 1.49 and is formed on the surface 14Ea with the V-projections 46 having a width equal to that of the flat regions 48 and an apex angle of 90 degrees. Since the critical angle of the PMMA material is 42 degrees, part of the parallel beam of light 22, which enters the inclined plane of the V-projection 46 at an incident angle of about 45 degrees, is totally reflected and not directed upwardly or toward the light-receiving elements 8 (FIG. 1A). As a result, light that is emitted from the flat regions 48 only is directed toward the light-receiving elements 8.

As such, the code pattern can be formed without the evaporated layer of chromium 44, allowing manufacturing cost of the code wheel to be reduced.

Sixth Embodiment

Figure 9A:
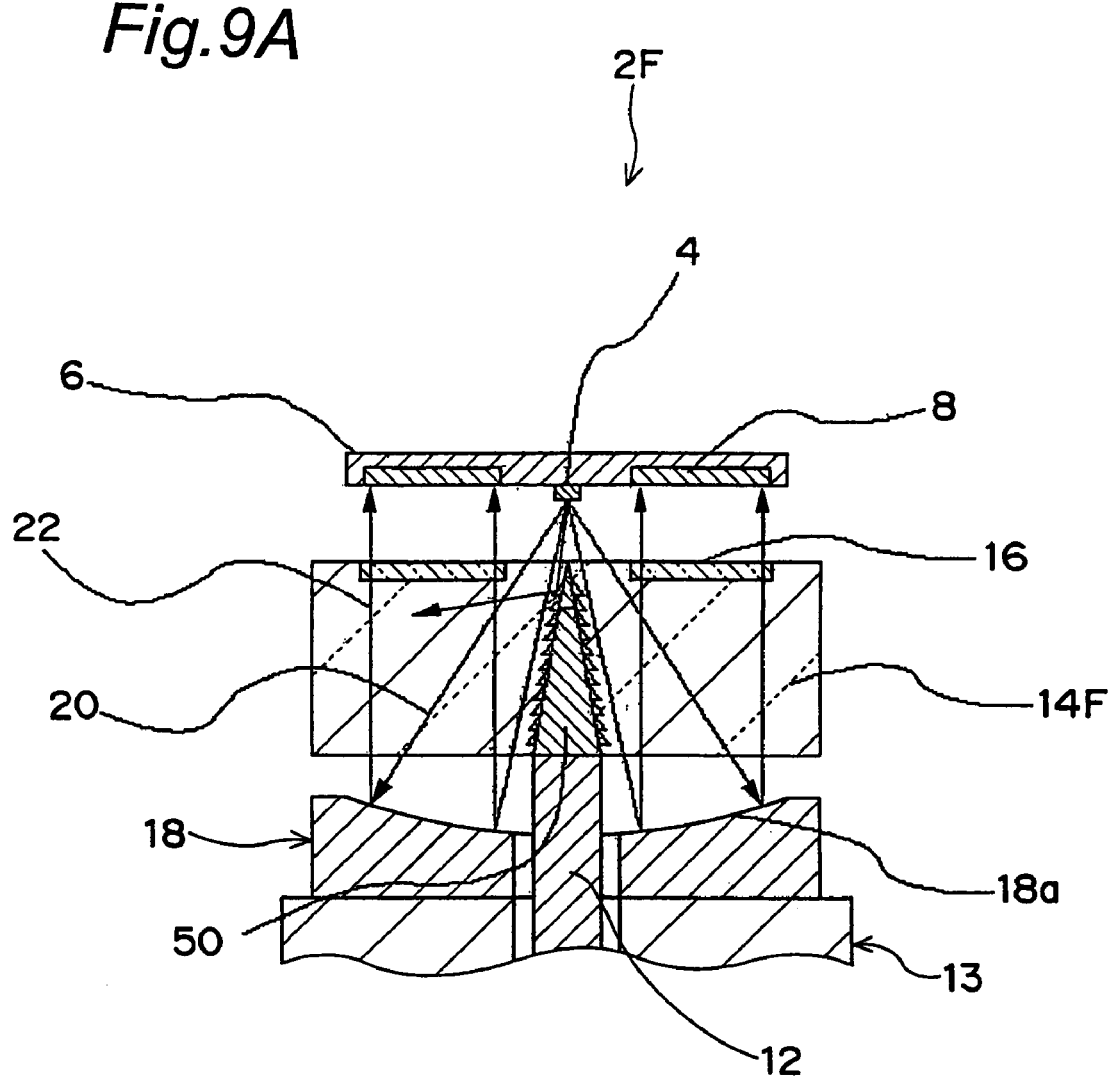
FIG. 9A is a schematic cross-sectional view taken along the axis of rotation of the shaft in a sixth embodiment of the optical rotary encoder according to the present invention.
Figure 9B:
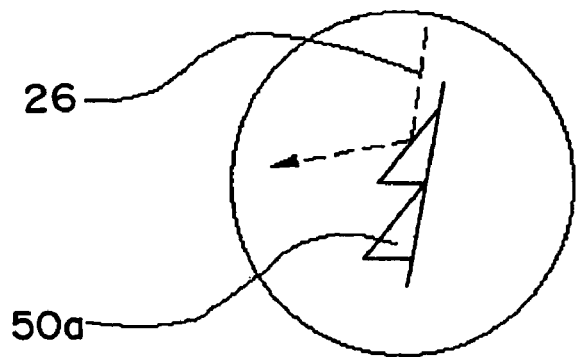
FIG. 9B is an enlarged partial cross-sectional view of the holding member in FIG. 9A.

FIG. 9A shows a sixth embodiment of the optical rotary encoder according to the present invention. The encoder 2F of the present embodiment is similar to the encoder 2 of the first embodiment except that the light absorption layer 24 is replaced by a holding member 50 for holding the code wheel 14F. Specifically, the code wheel 14F is made of resin such as PMMA and is integral with the holding member 50 made of a light reflective material such as metal, which is achieved by insert molding the code wheel 14F into the holding member 50. As shown in FIG. 9B, the holding member 50 has a backstop 50a at its side surface to enhance bonding with the code wheel 14F. The holding member 50 is fixed via, for example, an adhesive or a screw on the shaft 12.

Since the holding member 50 is made of, for example, metal and therefore the backstop 50a reflects light through its surface, part of light rays 26 emitted from the light source 4 which is not directed toward the concave mirror 18 but toward the backstop 50a is reflected by the backstop and then emitted from the code wheel 14F through its side surface or bottom surface (opposite to the surface 14a on which the code pattern 16 is formed). As a result, such light does not enter the light-receiving elements 8.

The insert molding enables the bond strength between the code wheel 14F and the holding member 50 to be increased, allowing the holding member 50 to be narrowed. This permits the surface area of the reflective surface 18*a* of the concave mirror 18 to be increased while the code wheel 14F has a diameter equal to that of the code wheel 14 of the first embodiment, allowing the radical widths of the code pattern 16 and the light-receiving elements 8 to be increased. Accordingly, if the size of the encoder is reduced, a sufficient light-receiving surface area and a sufficient number of tracks can still be obtained, ensuring high accuracy detection and high resolution. The inclined plane of the backstop 50*a* can be set to have an angle to suppress stray light which may otherwise enter the light-receiving elements 8 and cause detection error. In other words, the holding member 50 (the backstop 50*a*) functions as a light reflective member to prevent the reflected light from entering the light-receiving elements.

Seventh Embodiment

Figure 10:
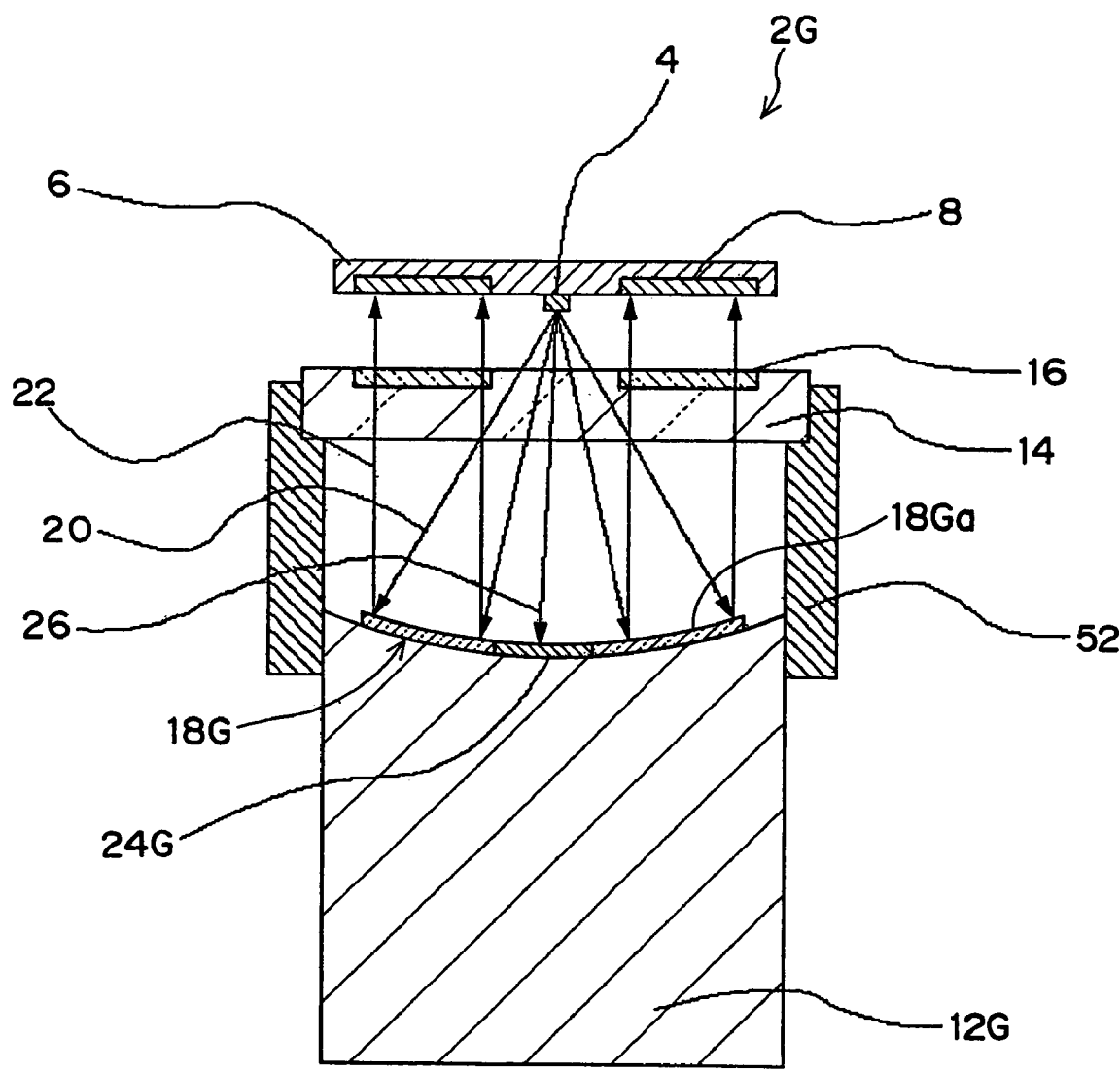
FIG. 10 is a schematic cross-sectional view taken along the axis of rotation of the shaft in a seventh embodiment of the optical rotary encoder according to the present invention.

FIG. 10 shows a seventh embodiment of the optical rotary encoder according to the present invention. The encoder 2G of the present embodiment is similar to the encoder 2 of the first embodiment except that a reflector or concave mirror 18G having a spherical reflective surface 18Ga is mounted on an spherical upper end of the shaft 12G. The reflective surface 18Ga is annularly formed and the concave mirror 18Ga has a light absorption layer 24G at the center surrounded by the reflective surface. The light absorption layer 24G functions to eliminate light which may cause detection error, i.e. light which is reflected back into the light source 4 and stray light which is reflected by a member other than the concave mirror 18G and enters the light-receiving elements 8. The code wheel 14 is connected via an adapter 52 in the form of a sleeve with the shaft 12G. The code wheel 14 is fixed by, for example, an adhesive to the adapter 52, which in turn is fixed by, for example, an adhesive or a screw to the shaft 12G.

In an operation of the encoder 2G, part of light rays 20 emitted from the light source 4 enters the reflective surface 18Ga and is turned into parallel beam of light 22. The parallel beam of light 22 passes through the code wheel 14 and illuminates the code pattern 16 thereon, so that light passing through the code pattern 16 enters the light-receiving elements 8. The incident light has an intensity distribution of square wave or sine wave which corresponds to the code pattern 16.

Part of light rays 26 emitted from the light source 4 which is not directed toward the concave mirror 18G but enters the light absorption layer 24G is absorbed by the layer and therefore does not cause detection error.

In the embodiment, a construction in which the concave mirror 18G is mounted on the end of the shaft 12G allows manufacturing/assembling cost to be reduced.

Eighth Embodiment

Figure 11:
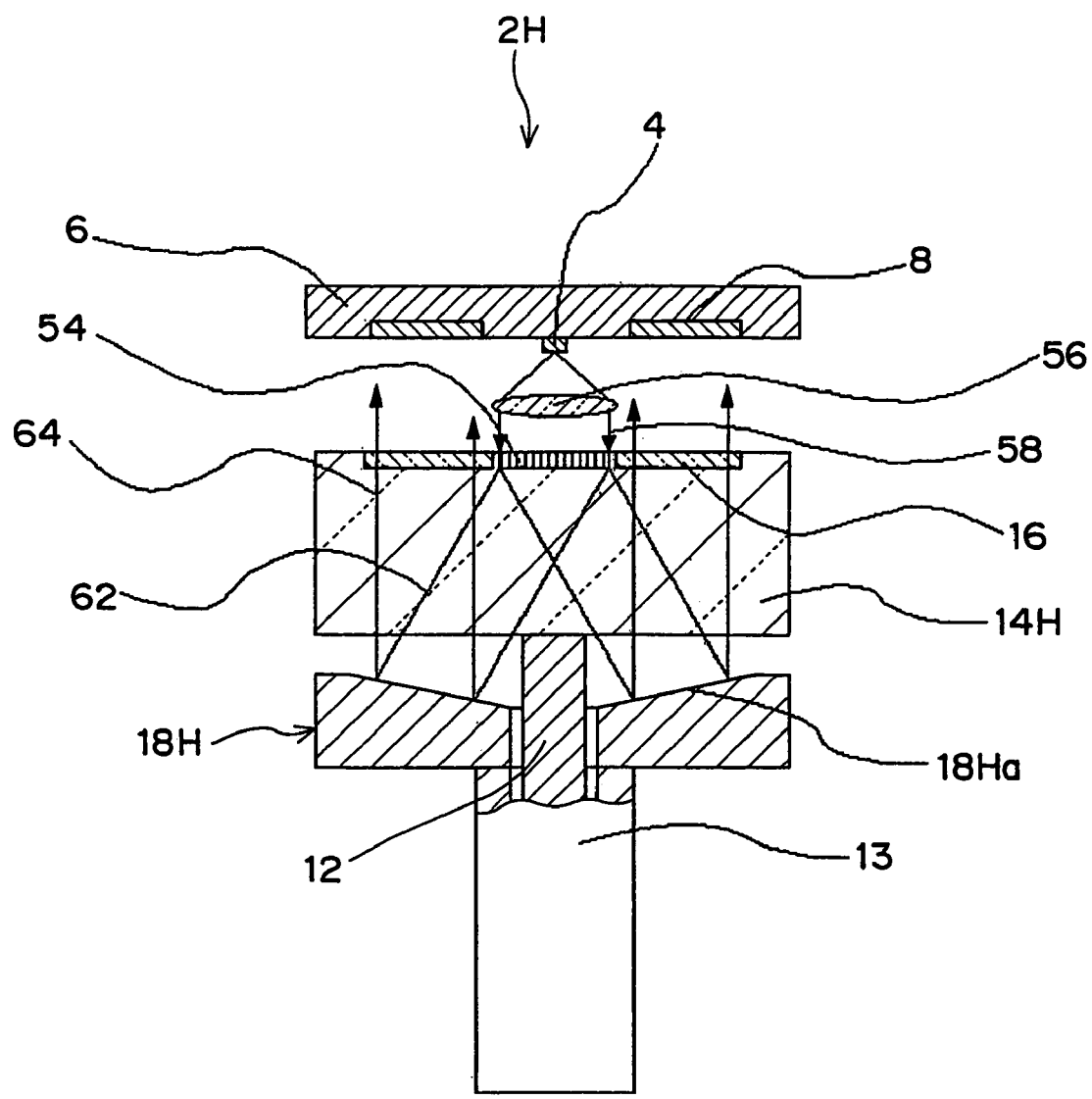
FIG. 11 is a schematic cross-sectional view taken along the axis of rotation of the shaft in an eighth embodiment of the optical rotary encoder according to the present invention.

FIG. 11 shows an eighth embodiment of the optical rotary encoder according to the present invention. The encoder 2H of the present embodiment is similar to the encoder 2 of the first embodiment except that a circular diffraction grating 54 is formed on the upper surface portion of the code wheel 14H surrounded by the code pattern 16 and a collimator lens 56 for turning light rays emitted from the light source 4 into parallel beam of light 58 is located between the light source 4 and the circular diffraction grating 54. The circular diffraction grating 54 consists of equally spaced and concentric zones centered at the axis of rotation. The circular diffraction grating 54 may be an amplitude grating or a phase grating. The code wheel 14H is fixed by, for example, an adhesive to the shaft 12. In the embodiment, the reflector or mirror 18H located below the code wheel 14H has a frustoconical reflective surface 18Ha.

In an operation of the encoder 2H so constructed, light rays emitted from the light source 4 are turned by the lens 56 into parallel beam of light 58 and then enter the circular diffraction grating 54 on the code wheel 14H. The parallel beam of light 58 is turned by the grating 54 into light rays 62 in the form of annular rings in transverse cross section and then reflected through the reflective surface 18Ha as parallel beam of light 64. The parallel beam of light 64 passes through the code wheel 14H and illuminates the code pattern 16 thereon, so that light passing through the code pattern 16 enters the light-receiving elements 8. The incident light has an intensity distribution of square wave or sine wave which corresponds to the code pattern 16. The light-receiving elements 8 convert the incident light into an electrical signal indicative of a rotation angle/speed of the code wheel 14H and therefore the shaft 12.

As such, the encoder 2H including the lens 56 and the circular diffraction grating 54 enables a parallelism of the parallel beam of light 64 to be unchanged even if a distance between the code wheel 14H and the lens 56 and/or a distance between the mirror 18H and the lens 56 are changed, allowing detection error to be suppressed. Like in the first, sixth and seventh embodiments, the parallel beam of light 64 can entirely illuminate the circumferential code pattern 16, allowing a small optical rotary encoder with high resolution to be provided. Also, since the optical axes of the optical system and the light source 4 can be coincident with the centerline, size constraints can be reduced, allowing downsizing of the encoder. Further, even if the orientation of the shaft 12 is varied, since the code pattern 16 is of a transmissive type, the relative position of the light source 4 and the concave mirror 18H is unchanged (because the code wheel 14H to which the shaft 12 is connected and the concave mirror 18H are separate.), and the code pattern 16 is illuminated by the parallel beam of light 64, the variation in illumination distribution on the light-receiving elements 8 due to the variation in orientation of the shaft 12 can be suppressed, allowing an optical rotary encoder with small detection error to be provided. In addition, since the parallel beam of light 58 is deflected by the circular diffraction grating 54, the width of the parallel beam of light 64 can be substantially equal to the diameter of the parallel beam of light 58. This allows the width of the code pattern 16 relative to the diameter of the code wheel 14H to be set larger.

Furthermore, since the light-receiving elements 8 are disposed over the entire circumference, detection error due to, for example, eccentricity or inclination of the shaft 12 or width accuracy of the transmissive areas of the code pattern 16 can be reduced. As a result, if the size of the encoder is reduced, a sufficient light-receiving surface area can still be obtained, ensuring high accuracy detection and high resolution. Although the light-receiving elements 8 are preferably disposed over the entire circumference, they may be disposed in at least one region which light emitted from the code pattern 16 enters. In this case, the reflective surface 18Ha may have a sufficient surface area on the concave mirror 18H to reflect light rays to illuminate the light-receiving elements 8 and, accordingly, may not be formed entirely around its centerline. An absorption layer may be formed on a surface portion where the reflective surface 18Ha is not formed.

The circular diffraction grating 54 may be separate from the code wheel 14H and located between the lens 56 and the code wheel 14H. Also, although in the embodiment the parallel beam of light 58 from the lens 56 is split by means of the circular diffraction grating 54, it may be replaced by a refractive optical element such as a conical prism (having a triangular cross section along the axis of rotation). In this case, the refractive optical element may be integral with the code wheel 14H or separate therefrom.

Ninth Embodiment

Figure 12:
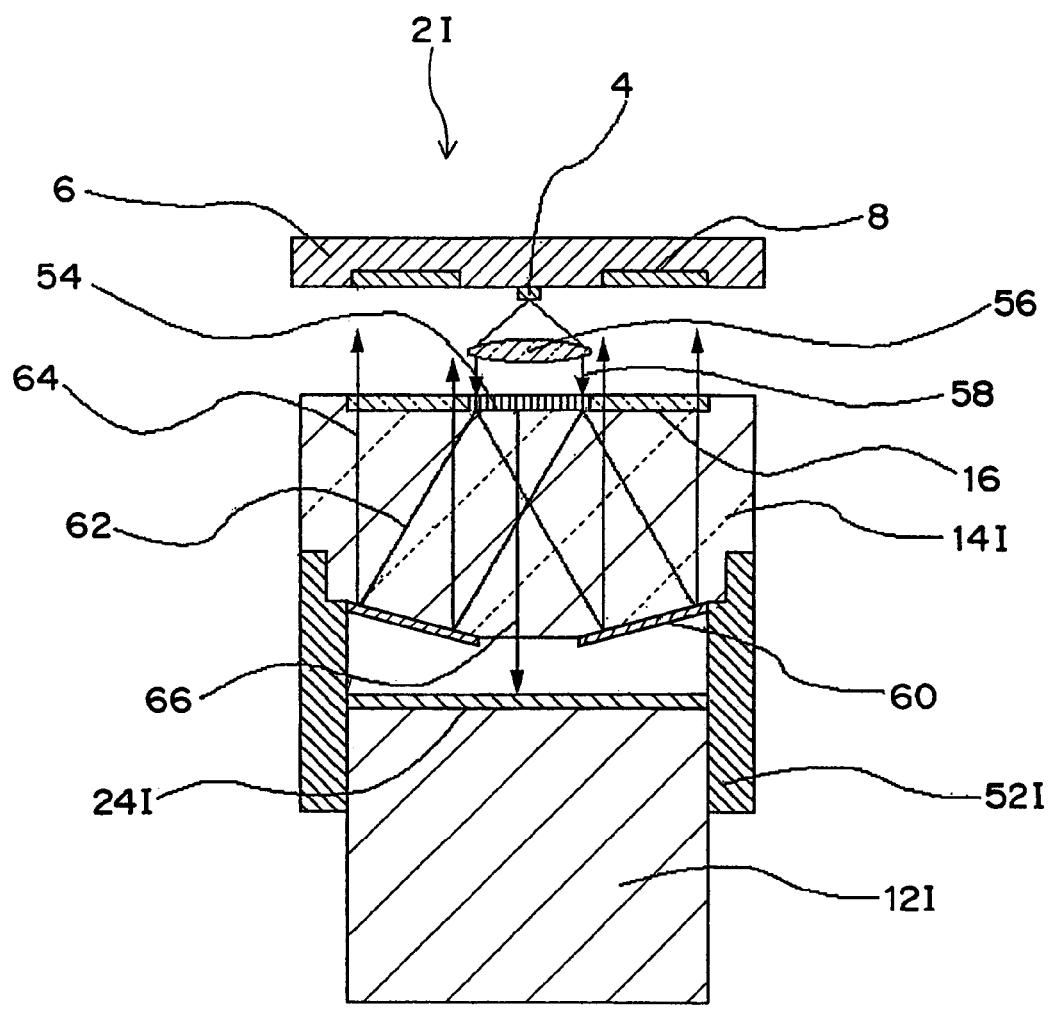
FIG. 12 is a schematic cross-sectional view taken along the axis of rotation of the shaft in a ninth embodiment of the optical rotary encoder according to the present invention.

FIG. 12 shows a ninth embodiment of the optical rotary encoder according to the present invention. The encoder 2I of the present embodiment is similar to the encoder 2H of the eighth embodiment except for the followings: In the embodiment, instead of positioning the mirror 18H below the code wheel 14H as shown in FIG. 11, the code wheel 14I has a frustoconical reflective surface 60 opposite to the upper surface (on which the code pattern 16 and the circular diffraction grating 54 are formed). The reflective surface 60 is formed on the molded code wheel 14I by evaporation of aluminum, for example. Light can pass through the lower surface portion of the code wheel 14I surrounded by the reflective surface 60. It is noted that reference number 52I indicates a sleeve adapter for connecting the code wheel 14I to the shaft 12I. A light absorption layer 24I is formed on the upper end of the shaft 12I.

The operation of the encoder 2I is similar to that of the encoder 2H. That is, light rays emitted from the light source 4 are turned by the lens 56 into parallel beam of light 58 and then enter the circular diffraction grating 54 on the code wheel 14I. The parallel beam of light 58 is turned by the grating 54 into light rays 62 in the form of annular rings in transverse cross section and then reflected through the frustoconical reflective surface 60 as parallel beam of light 64. The parallel beam of light 64 passes through the code wheel 14I and illuminates the code pattern 16 thereon, so that light passing through the code pattern 16 enters the light-receiving elements 8. The incident light has an intensity distribution of square wave or sine wave which corresponds to the code pattern 16.

Part of light rays 66 emitted from the light source 4 which is not directed toward the frustoconical reflective surface 60 but passes through the lower surface portion of the code wheel 14I surrounded by the reflective surface 60 is absorbed by the light absorption layer 24I and therefore does not cause detection error.

As such, since the code pattern 16 and the reflective surface 60 are formed on a single element, i.e. the code wheel 14I, manufacturing/assembling cost can be reduced and concentricity between the code pattern 16 and the reflective surface 60 can be improved. Also, a parallelism of the parallel beam of light 64 is unchanged even if a distance between the code wheel 14H (the reflective surface 60) and the lens 56 is changed, thereby suppressing detection error. Like in the first, sixth to eighth embodiments, the parallel beam of light 64 can entirely illuminate the circumferential code pattern 16, allowing a small optical rotary encoder with high resolution to be provided. Further, since the parallel beam of light 58 is deflected by the circular diffraction grating 54, the width of the parallel beam of light 64 can be substantially equal to the diameter of the parallel beam of light 58. This allows the width of the code pattern 16 relative to the diameter of the code wheel 14I to be set larger.

The frustoconical reflective surface may be formed on the upper end of the shaft 12I instead of on the code wheel 14I.

Tenth Embodiment

Figure 13:
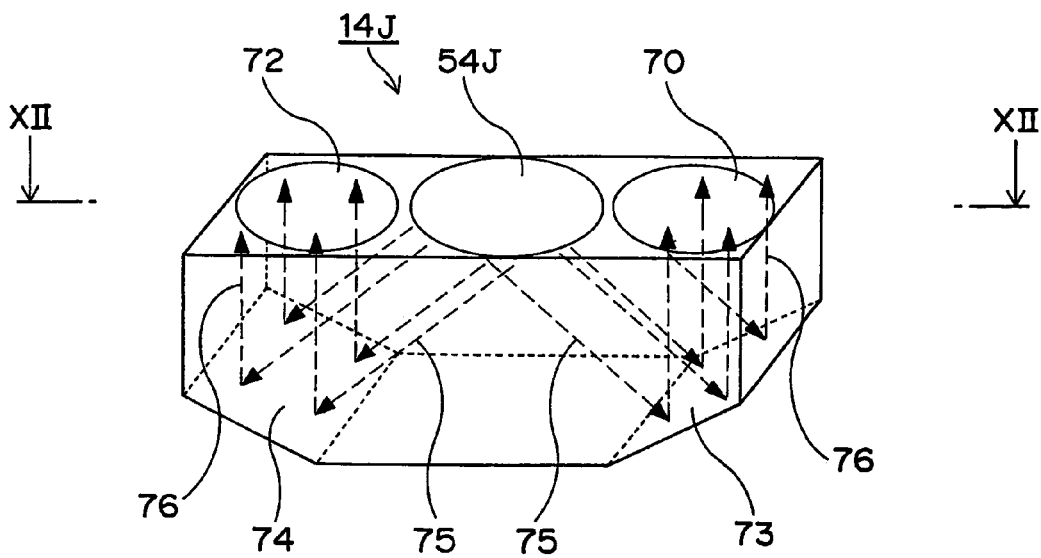
FIG. 13 is a perspective view showing a code wheel of a tenth embodiment of the optical rotary encoder according to the present invention.
Figure 14:
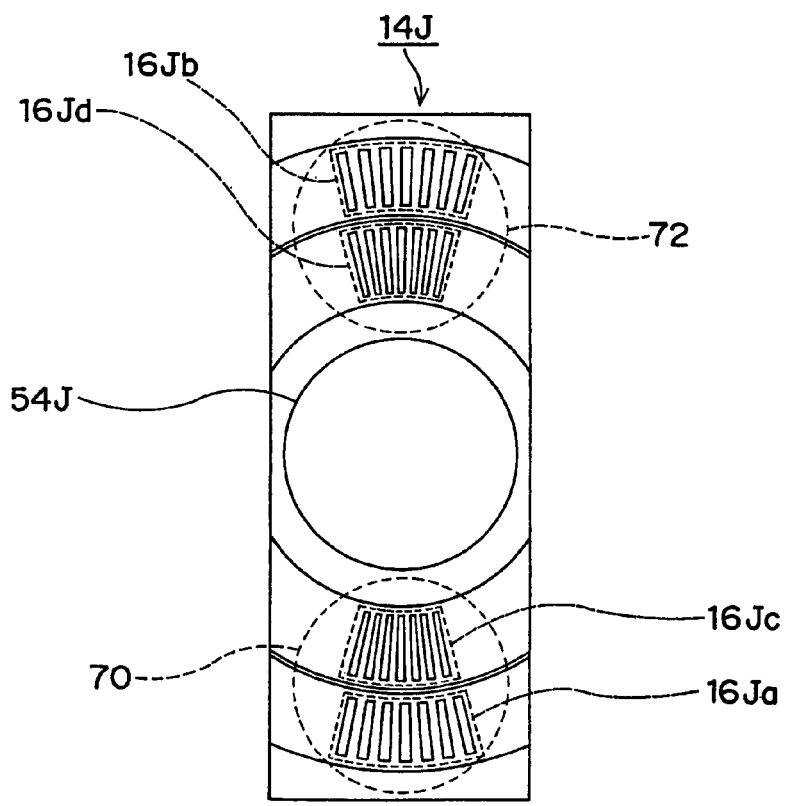
FIG. 14 is a top view of the code wheel in FIG. 13.

FIGS. 13 and 14 show a tenth embodiment of the optical rotary encoder according to the present invention. The encoder of the present embodiment is similar to the encoder 2I of the ninth embodiment except for the configurations of the code pattern on the code wheel, the diffraction grating, and the reflective surface. A cross section taken along line XII—XII of FIG. 13 is identical to FIG. 12.

Unlike in the ninth embodiment, the diffraction grating 54J is a one-dimensional periodic amplitude or phase grating. The code pattern consists of four code patterns 16Ja, 16Jb, 16Jc and 16Jd. Each of the code patterns 16Ja–16Jd has alternating light transmissive and non-transmissive areas arranged in a circumferentially equally spaced relation and is formed on the upper surface of the code wheel 14J by, for example, evaporation of chromium. A pair of the code patterns 16Ja and 16Jc and a pair of the code patterns 16Jb and 16Jd are formed on opposite regions 70 and 72 with regard to the pitch direction of the diffraction grating 54J. The code patterns 16Ja and 16Jb are in an outer circumferential track and have an identical phase. The code patterns 16Jc and 16Jd are in an inner circumferential track and have an identical phase shifted, for example, 90 degrees with regard to that of the outer track.

The reflective surface formed on the lower surface of the code wheel 14J consists of a pair of plane reflective surfaces 73 and 74. They are arranged so that diffraction rays 75 at the ±first order emitted from the grating 54J are reflected therethrough to turn into parallel beam of light 76 that is parallel to the axis of rotation of the shaft.

Referring also to FIG. 12, in an operation of the encoder of the present embodiment, parallel beam of light emitted from the collimator lens 56 enters the diffraction grating 54J on the code wheel 14J. Then, diffraction rays 75 at the ±first order are emitted from the grating 54J and then reflected through the reflective surfaces 73 and 74 to turn into parallel beam of light 76 that is parallel to the axis of rotation of the shaft 12I. Next, the parallel beam of light 76 enters the regions 70 and 72. Then, while the code wheel 14J rotates, light passing through the code patterns 16Ja–16Jd moves on the light-receiving elements 8 arranged in a circumferentially spaced relation and entirely around the light source, like the elements 8C in FIG. 6. That is, the receiving surfaces of the light-receiving elements 8 are disposed over the entire circumference with an angle frequency equal to that of the code patterns 16Ja–16Jd. The incident light has an intensity distribution of square wave or sine wave which corresponds to the code patterns 16Ja–16Jd. The light-receiving elements 8 convert the incident light into an electrical signal indicative of a rotation angle/speed of the code wheel 14J and therefore the shaft 12I.

As such, by positioning the one-dimensional periodic grating 54J at the center of the code wheel 14J, a variation in light intensity distribution of the parallel beam of light 76 on the regions 70 and 72 can be suppressed even if the axis of rotation of the code wheel 14J is displaced from the optical axis of the light source 4. The encoder including the lens 56 and the diffraction grating 54J enables a parallelism of the parallel beam of light 76 to be unchanged even if a distance between the code wheel 14J (the plane reflective surfaces 73 and 74) and the lens 56 is changed, thereby suppressing detection error. Like in the first and sixth to ninth embodiments, since the code patterns 16Ja–16Jd can be illuminated by the parallel beam of light 76, a small optical rotary encoder with high resolution can be provided. Also, since the optical axes of the optical system and the light source 4 can be coincident with the centerline, size constraints can be reduced, allowing downsizing of the encoder. Further, since the parallel beam of light is deflected by the diffraction grating 54J, the diameter of the parallel beam of light can be equal to the width of the parallel beam of light 76. This allows the width of the code patterns 16Ja–16Jd relative to the diameter of the code wheel 14J to be set larger.

Note that in the embodiment the light-receiving elements 8 should be disposed in a circumference and entirely around the light source 4.

Note that a pair of sides between the upper surface (on which the code patterns 16Ja–16Jd and the diffractive grating 54J are formed) and the reflective surfaces 73 and 74 may not be flat and may be circular arc. In other words, the code wheel 14J may be manufactured by cutting from a cylindrical block.

Also, although in the embodiment the parallel beam of light 58 from the lens 56 is split by means of the circular diffraction grating 54J, it may be replaced by a refractive optical element such as a triangular prism (having a triangular cross section along the axis of rotation). In this case, the refractive optical element may be integral with the code wheel 14J or separate therefrom.

Note that in the eighth embodiment (FIG. 11) the circular diffraction grating 54 and the mirror 18H having the frustoconical reflective surface 18Ha may be replaced by a one-dimensional periodic diffraction grating located between the code wheel 14H and the lens 56 (i.e. the grating does not rotate with the code wheel 14H) and a pair of plane mirrors, respectively. In this case, since light emitted from the code wheel 14H enters two separate regions on the substrate 6, the light-receiving elements 8 may be located on the regions only.

Eleventh Embodiment

Figure 15:
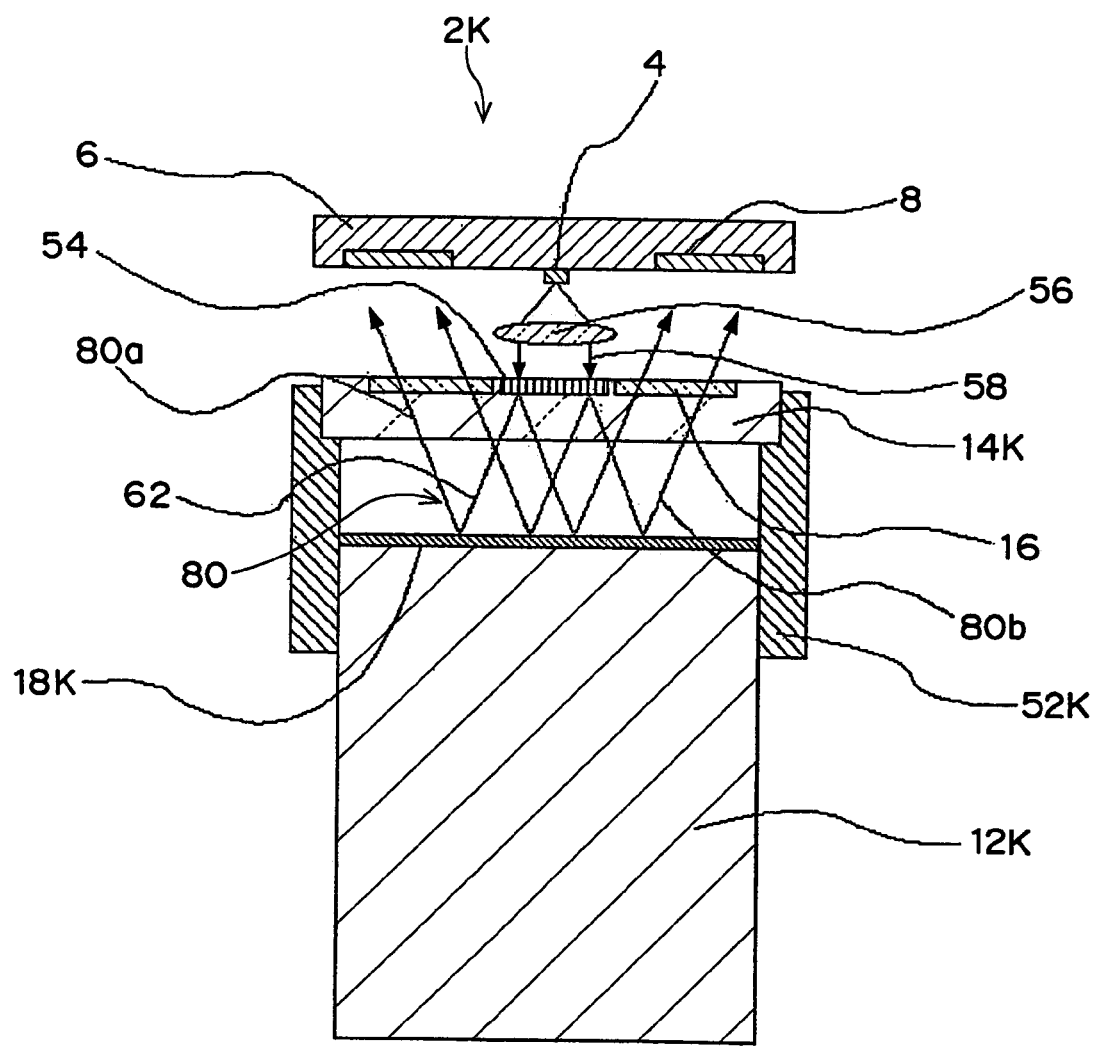
FIG. 15 is a schematic cross-sectional view taken along the axis of rotation of the shaft in an eleventh embodiment of the optical rotary encoder according to the present invention.

FIG. 15 shows an eleventh embodiment of the optical rotary encoder according to the present invention. The encoder 2K of the present embodiment is similar to the encoder 2H of the eighth embodiment except that a plane mirror 18K is mounted on the upper end of the shaft 12K. It is noted that reference number 52K indicates a sleeve adapter for connecting the code wheel 14K to the shaft 12K.

In an operation of the encoder 2K, light rays emitted from the light source 4 are turned by the lens 56 into parallel beam of light 58 and then enter the circular diffraction grating 54 on the code wheel 14K. The parallel beam of light 58 is turned by the grating 54 into light rays 62 in the form of annular rings in transverse cross section. Then, the light rays 62 are reflected by the mirror 18K to turn into beam of light 80 which is in the form of annular rings in transverse cross section and diverges in an inverted frustoconical shape. In FIG. 15, which is a cross section taken along the axis of rotation of the shaft 12K, the beam of light 80 is a pair of parallel beams of light 80a and 80b. The beam of light 80 passes through the code wheel 14K and illuminates the code pattern 16 thereon, so that light passing through the code pattern 16 enters the light-receiving elements 8. The incident light has an intensity distribution of square wave or sine wave which corresponds to the code pattern 16.

As such, the encoder 2K including the lens 56 and the circular diffraction grating 54 enables a variation in light intensity distribution of the beam of light 80 on the code pattern 16 can be suppressed even if a distance between the code wheel 14K and the lens 56 is changed, thereby suppressing detection error.

Also, since each of the beams of light 80a and 80b in the drawing consists of light rays which are parallel to each other, the radial width of the light transmissive areas of the code pattern 16 may be generally equal to that of the light-receiving elements 8. By setting a distance between the circular diffraction grating 54 and the plane mirror 18K to be larger and a diffraction angle of the grating smaller, an angle of the parallel beams of light 80a and 80b relative to the axis of rotation of the shaft 12K is smaller. As a result, the radial distance of the outer periphery of the light-receiving elements 8 from the rotational axis is smaller, allowing a small optical rotary encoder with high resolution to be provided.

Further, like in the first and sixth to tenth embodiments, since the optical axes of the optical system and the light source 4 can be coincident with the axis of rotation of the shaft 12K, size constraints can be reduced, allowing downsizing of the encoder. In addition, since the parallel beam of light 58 is deflected by the circular diffraction grating 54, the width of each of the parallel beams of light 80a and 80b can be substantially equal to the diameter of the parallel beam of light 58. This allows the width of the code pattern 16 relative to the diameter of the code wheel 14K to be set larger.

The circular diffraction grating 54 may be separate from the code wheel 14K and located between the lens 56 and the code wheel 14K. The circular diffraction grating 54 may be replaced by the one-dimensional periodic diffraction grating 54J described in the tenth embodiment. In this case, the code wheel 14J and the light-receiving elements 8 described in the tenth embodiment are used.

Twelfth Embodiment

Figure 16:
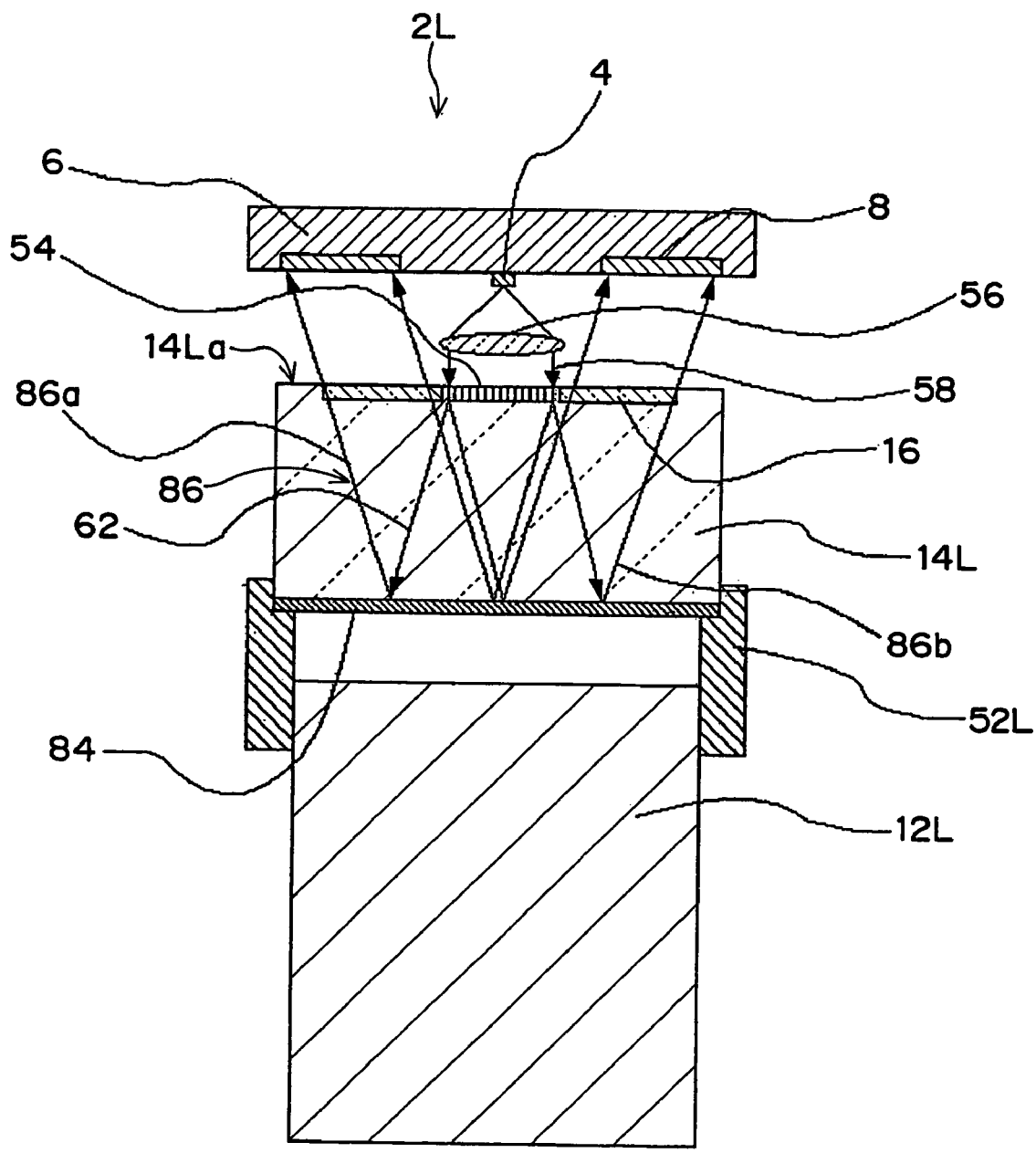
FIG. 16 is a schematic cross-sectional view taken along the axis of rotation of the shaft in a twelfth embodiment of the optical rotary encoder according to the present invention.

FIG. 16 shows a twelfth embodiment of the optical rotary encoder according to the present invention. The encoder 2L of the present embodiment is similar to the encoder 2K of the eleventh embodiment except that the code wheel 14L has a flat reflective surface 84 opposite to the surface 14La having the code pattern 16 and the circular diffraction grating 54 thereon. It is noted that reference number 52L indicates a sleeve adapter for connecting the code wheel 14L to the shaft 12L.

The operation of the encoder 2L is similar to that of the encoder 2K of the eleventh embodiment. That is, light rays emitted from the light source 4 are turned by the lens 56 into parallel beam of light 58 and then enter the circular diffraction grating 54 on the code wheel 14L. The parallel beam of light 58 is turned by the grating 54 into light rays 62 in the form of annular rings in transverse cross section. Then, the light rays 62 are reflected at the reflective surface 84 to turn into beam of light 86 which is a pair of parallel beams of light 86a and 86b in FIG. 16, which is a cross section taken along the axis of rotation of the shaft 12L. The beam of light 86 passes through the code wheel 14L and illuminates the code pattern 16 thereon, so that light passing through the code pattern 16 enters the light-receiving elements 8. The incident light has an intensity distribution of square wave or sine wave which corresponds to the code pattern 16.

In the embodiment, a construction in which the reflective surface 84 is formed on the code wheel 14L allows manufacturing/assembling cost to be reduced.

In the eleventh embodiment (FIG. 15), the beams of light 80a and 80b are not parallel to each other. Likewise, in the twelfth embodiment (FIG. 16), the beams of light 86a and 86b are not parallel to each other. However, light rays in each of the beams of light 80a, 80b, 86a or 86b are parallel to each other. In other words, the width of each of the beams of light 80a, 80b, 86a and 86b is substantially unchanged. Herein, the term "parallel beam of light" designates not only those in the first to tenth embodiments but also those in the eleventh and twelfth embodiments, i.e. beam of light, the width of which is substantially unchanged where the width is defined as the length of the beam of light in cross section along the axis of rotation of the shaft.

Thirteenth Embodiment

Figure 17:
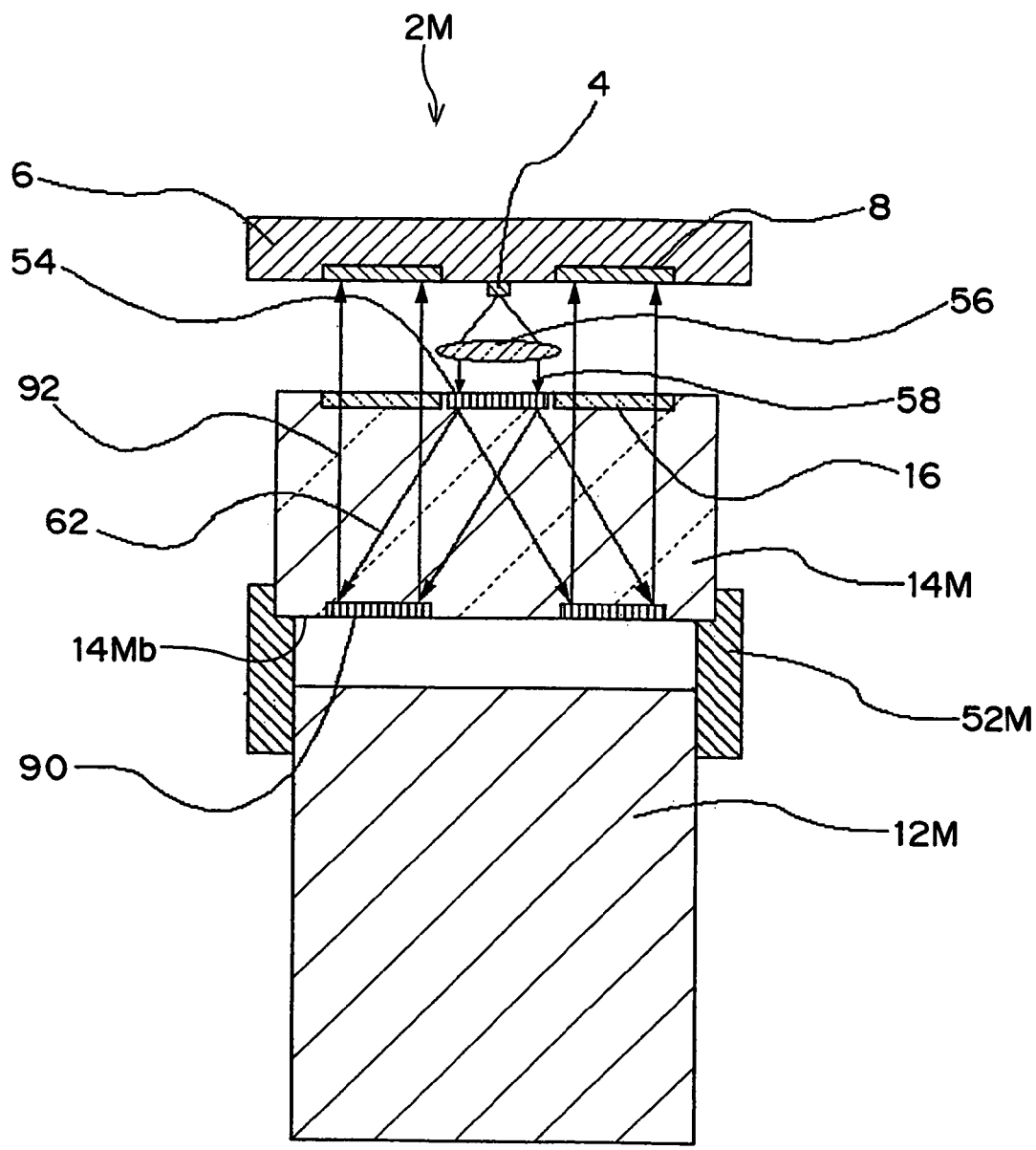
FIG. 17 is a schematic cross-sectional view taken along the axis of rotation of the shaft in a thirteenth embodiment of the optical rotary encoder according to the present invention.

FIG. 17 shows a thirteenth embodiment of the optical rotary encoder according to the present invention. The encoder 2M of the present embodiment is similar to the encoder 2L of the twelfth embodiment except that the code wheel 14M has a flat lower surface 14 Mb on which a reflective diffraction grating 90 such as blazed grating is formed. The reflective diffraction grating 90 consists of equally spaced and concentric zones with a pitch equal to that of the circular diffraction grating 54. It is noted that reference number 52M indicates a sleeve adapter for connecting the code wheel 14M to the shaft 12M.

In an operation of the encoder 2M, light rays emitted from the light source 4 are turned by the lens 56 into parallel beam of light 58 and then enter the circular diffraction grating 54 on the code wheel 14M. The parallel beam of light 58 is turned by the grating 54 into light rays 62 in the form of annular rings in transverse cross section, as in the twelfth embodiment. Then, the light rays 62 are reflected and diffracted by the reflective diffraction grating 90 to turn into parallel beam of light 92. The parallel beam of light 92, which is parallel to the axis of rotation of the shaft 12M, passes through the code wheel 14M and illuminates the code pattern 16 thereon, so that light passing through the code pattern 16 enters the light-receiving elements 8. The incident light has an intensity distribution of square wave or sine wave which corresponds to the code pattern 16.

By using the reflective diffraction grating 90 instead of the reflective surface 84 in the twelfth embodiment, the circumferential code pattern 16 can entirely be illuminated by the parallel beam of light 92, as in the first and sixth to ninth embodiments, allowing a small optical rotary encoder with high resolution to be provided. Also, a construction in which the reflective diffraction grating 90 is formed on the code wheel 14M allows manufacturing/assembling cost to be reduced. Further, since the parallel beam of light 58 is deflected by the circular diffraction grating 54 and then the reflective diffraction grating 90, the width of the parallel beam of light 92 can be substantially equal to the diameter of the parallel beam of light 58. This allows the width of the code pattern 16 relative to the diameter of the code wheel 14M to be set larger.

Although in the embodiment the parallel beam of light 58 from the lens 56 is split by means of the circular diffraction grating 54, it may be replaced by a refractive optical element such as a conical prism. In this case, the refractive optical element may be integral with the code wheel 14M or separate therefrom.

Note that in the eleventh embodiment the plane mirror 18K on the upper end of the shaft 12K may be replaced by the reflective diffraction grating 90.

Also, the circular diffraction gratings 54 may be replaced by a one-dimensional periodic amplitude or phase grating such as the grating 54J in the tenth embodiment and the reflective diffraction grating 90 may be correspondingly replaced by a one-dimensional periodic amplitude or phase grating. In this case, the code wheel 14J and the light-receiving elements described in the tenth embodiment are used. In this variant, by positioning the one-dimensional periodic grating at the center of the code wheel 14M, a variation in light intensity distribution of the parallel beam of light 92 on the code pattern 16 can be suppressed even if the axis of rotation of the code wheel 14M is displaced from the optical axis of the light source 4.

What is claimed is:

1. An optical rotary encoder for acquiring rotation information regarding a shaft, comprising:
   a light source located on or proximate an axis of rotation of a shaft, the light source emitting light;
   a code wheel mounted on the shaft for rotation about the axis of rotation, the code wheel having a plurality of alternating light transmissive and non-light transmissive areas in a circumferential direction;
   a reflector mounted on an end of the shaft and spaced a distance from the code wheel for reflecting the light emitted from the light source to form a parallel beam of light, the parallel beam of light illuminating the code wheel so that light passing through the light transmissive areas is directed toward a region peripheral to the light source; and
   at least one light-detecting element for detecting the light reflected from the reflector and passing through the light transmissive areas.

2. An optical rotary encoder for acciuiring rotation information regarding a shaft, comprising:
   a light source located on or proximate an axis of rotation of a shaft, the light source emitting light;
   a code wheel mounted on the shaft for rotation about the axis of rotation, the code wheel having a plurality of alternating light transmissive and non-light transmissive areas in a circumferential direction;
   a reflector spaced a distance from the code wheel for reflecting the light emitted from the light source to form a parallel beam of light, the parallel beam of light illuminating the code wheel so that light passing through the light transmissive areas is directed toward a region peripheral to the light source, the reflector having a through hole through which the shaft extends;
   at least one light-detecting element for detecting the light reflected from the reflector and passing through the light transmissive areas; and
   a light absorber located on an end of the shaft.

3. The optical rotary encoder in accordance with claim 2, wherein the parallel beam of light is substantially parallel to the axis of rotation.

4. The optical rotary encoder in accordance with claim 2, wherein the reflector is a concave mirror.

5. The optical rotary encoder in accordance with claim 2, wherein the reflector has an opening which extends along the axis of rotation and connects the through hole and a peripheral surface of the reflector.

6. The optical rotary encoder in accordance with claim 2, wherein the reflector reflects the light emitted from the light source toward the region peripheral to the light source in a single reflection.

7. An optical rotary encoder in for acciuiring rotation information regarding a shaft, comprising:
   a light source located on or proximate an axis of rotation of a shaft, the light source emitting light;
   a code wheel mounted on the shaft for rotation about the axis of rotation, the code wheel having a plurality of alternating light transmissive and non-light transmissive areas in a circumferential direction;
   a reflector spaced a distance from the code wheel for reflecting the light emitted from the light source to form a parallel beam of light, the parallel beam of light illuminating the code wheel so that light passing through the light transmissive areas is directed toward a region peripheral to the light source, the reflector having a through hole through which the shaft extends;

at least one light-detecting element for detecting the light reflected from the reflector and passing through the light transmissive areas; and a reflective member coaxial with the axis of rotation and including reflective surfaces oblique to the axis of rotation light so that the light reflected from the reflective member does not enter the light-detecting elements.

8. The optical rotary encoder in accordance with claim 7, wherein the parallel beam of light is substantially parallel to the axis of rotation.

9. The optical rotary encoder in accordance with claim 7, wherein the reflector is a concave mirror.

10. The optical rotary encoder in accordance with claim 7, wherein the reflector has an opening which extends along the axis of rotation and connects the through hole and a peripheral surface of the reflector.

11. An optical rotary encoder for acquiring rotation information regarding a shaft, comprising:

a light source located on or proximate an axis of rotation of a shaft, the light source emitting light rays;

a collimator for forming the light rays emitted from the light source into a first parallel beam of light;

a beam splitter for splitting the first parallel beam of light from the collimator;

a code wheel mounted on the shaft for rotation about the axis of rotation, the code wheel having a plurality of alternating light transmissive and non-light transmissive areas in a circumferential direction;

a reflector spaced a distance from the code wheel for reflecting light rays split by the beam splitter to form a second parallel beam of light, the second parallel beam of light illuminating the light transmissive areas of the code wheel so that light passing through the light transmissive areas is directed toward a peripheral region of the light source; and at least one light-detecting element for detecting the light passing through the light transmissive areas.

12. The optical rotary encoder in accordance with claim 11, wherein the beam splitter is a diffraction grating for diffracting the first parallel beam of light from the collimator.

13. The optical rotary encoder in accordance with claim 12, wherein the diffraction grating is a circular diffraction grating and the reflector has a frustoconical reflective surface.

14. The optical rotary encoder in accordance with claim 12, wherein the diffraction grating is a one-dimensional periodic diffraction grating for diffracting the first parallel beam of light from the collimator, and the reflector is a plane mirror.

15. The optical rotary encoder in accordance with claim 12, wherein the reflector is a reflective diffraction grating having a pitch equal to that of the diffraction grating for diffracting the first parallel beam of light from the collimator.

16. The optical rotary encoder in accordance with claim 11, wherein the reflector is mounted on an end of the shaft.

17. The optical rotary encoder in accordance with claim 11, including a light absorber located on the axis of rotation.

18. An optical rotary encoder for acquiring rotation information regarding a shaft, comprising:

a light source located on or proximate an axis of rotation of a shaft, the light source emitting light rays;

a collimator for forming the light rays emitted from the light source into a first parallel beam of light;

a beam splitter for splitting the first parallel beam of light from the collimator;

a code wheel mounted on the shaft for rotation about the axis of rotation, the code wheel having a plurality of alternating light transmissive and non-light transmissive areas in a circumferential direction and a reflective surface for reflecting light rays split by the beam splitter to form a second parallel beam of light, the second parallel beam of light illuminating the light transmissive areas of the code wheel so that light passing through the light transmissive areas is directed toward a peripheral region of the light source; and at least one light-detecting element for detecting the light passing through the light transmissive areas.

19. The optical rotary encoder in accordance with claim 18, wherein the beam splitter is a diffraction grating for diffracting the first parallel beam of light from the collimator.

20. The optical rotary encoder in accordance with claim 19, wherein the diffraction grating is a circular diffraction grating and the reflective surface is frustoconical.

21. The optical rotary encoder in accordance with claim 19, wherein the diffraction grating is a one-dimensional periodic diffraction grating for diffracting the first parallel beam of light from the collimator, and the reflective surface is planar.

22. The optical rotary encoder in accordance with claim 19, wherein the reflective surface is a reflective diffraction grating having a pitch equal to that of the diffraction grating for diffracting the first parallel beam of light from the collimator.

* * * * *